United States Patent
Janco et al.

(10) Patent No.: US 12,003,289 B2
(45) Date of Patent: Jun. 4, 2024

(54) SYSTEM AND METHOD FOR RADIO FREQUENCY FINGERPRINTING

(71) Applicant: LEVL PARENT, LLC, Wilmington, DE (US)

(72) Inventors: Noam Janco, Tel Aviv (IL); Nuriel Rogel, Rehovot (IL)

(73) Assignee: LEVL PARENT, LLC, Wilmington, DE (US)

( * ) Notice: Subject to any disclaimer, the term of this patent is extended or adjusted under 35 U.S.C. 154(b) by 0 days.

(21) Appl. No.: 17/838,383

(22) Filed: Jun. 13, 2022

(65) Prior Publication Data

US 2022/0399920 A1     Dec. 15, 2022

Related U.S. Application Data

(60) Provisional application No. 63/210,055, filed on Jun. 13, 2021.

(51) Int. Cl.
*H04B 7/0456* (2017.01)
*H04B 7/0417* (2017.01)

(52) U.S. Cl.
CPC ......... *H04B 7/0478* (2013.01); *H04B 7/0417* (2013.01); *H04B 7/0482* (2013.01)

(58) Field of Classification Search
CPC ...... H04B 7/0478; H04B 7/06; H04B 7/0417; H04B 7/0482; G06N 20/00
See application file for complete search history.

(56) References Cited

U.S. PATENT DOCUMENTS

| 8,718,682 B2 * | 5/2014 | Brownworth ....... G01S 5/02521 455/456.1 |
| 9,838,107 B2 * | 12/2017 | Jo .......................... H04B 7/063 |
| 10,605,908 B2 | 3/2020 | Kravets |

(Continued)

FOREIGN PATENT DOCUMENTS

| CN | 109165678 A | 1/2019 |
| CN | 109919015 A | 6/2019 |

(Continued)

OTHER PUBLICATIONS

Florian Adamsky et al, "WLAN Device Fingerprinting using Channel State Information (CSI)"; WiSec '18: Proceedings of the 11th ACM Conference on Security pp. 277-278, Jun. 18-20, 2018.

(Continued)

*Primary Examiner* — Jaison Joseph
(74) *Attorney, Agent, or Firm* — The Roy Gross Law Firm, LLC; Roy Gross

(57) ABSTRACT

A computer-implemented method comprising: monitoring transmissions representing estimation of a wireless channel, between at least one wireless access point (AP) and a plurality of wireless stations (STAs); at a training stage, training a machine learning model on a training dataset comprising: (i) a plurality dataframes of a standard beamforming protocol associated with at least some of the monitored transmissions, and (ii) labels indicating an association between the dataframes and the STAs; and at an inference stage, applying the trained machine learning model to a target transmission representing estimation of a wireless channel, to predict whether the target transmission was transmitted from one of the STAs.

16 Claims, 8 Drawing Sheets

(56) References Cited

U.S. PATENT DOCUMENTS

| | | | |
|---|---|---|---|
| 2017/0311279 A1* | 10/2017 | Gao | G01S 5/021 |
| 2020/0067616 A1* | 2/2020 | Blokh | H04B 17/391 |
| 2020/0220593 A1* | 7/2020 | Wen | H04B 7/0626 |
| 2020/0264292 A1 | 8/2020 | Kravets | |
| 2020/0413255 A1 | 12/2020 | James | |
| 2021/0048507 A1* | 2/2021 | Kuzdeba | G01S 7/417 |
| 2022/0109950 A1* | 4/2022 | Tadayon | G06N 20/00 |
| 2022/0124487 A1* | 4/2022 | Lin | H04L 63/08 |
| 2022/0264514 A1* | 8/2022 | Butt | G01S 5/0244 |
| 2022/0399920 A1* | 12/2022 | Janco | H04B 7/0478 |
| 2023/0130863 A1* | 4/2023 | Kuzdeba | G06N 3/063 |
| | | | 706/41 |

FOREIGN PATENT DOCUMENTS

| | | |
|---|---|---|
| EP | 3144693 A1 | 3/2017 |
| WO | 2016200579 A1 | 12/2016 |

OTHER PUBLICATIONS

Hongbo Liu et al, "Practicial user authentication leveraging channel state information (CSI)"; ASIA CCS '14: Proceedings of the 9th ACM symposium on Information, computer and communications security, Jun. 4, 2014 pp. 389-400. DOI:10.1145/2590296.2590321.

Samer Hanna et al, "Open Set Wireless Transmitter Authorization: Deep Learning Approaches and Dataset Considerations"; in IEEE Transactions on Cognitive Communications and Networking, vol. 7, No. 1, pp. 59-72, Mar. 2021, doi: 10.1109/TCCN.2020.3043332.

Saklain Zaman et al, "A Deep Learning Based Device Authentication Scheme Using Channel State Information"; 2018 International Conference on Innovation in Engineering and Technology (ICIET), Dhaka, Bangladesh, 2018, pp. 1-5, doi: 10.1109/CIET.2018.8660937.

* cited by examiner

SYSTEM AND METHOD FOR RADIO FREQUENCY FINGERPRINTING

CROSS-REFERENCE TO RELATED APPLICATIONS

This application claims the benefit of priority from U.S. Provisional Patent Application No. 63/210,055, filed on Jun. 13, 2021, entitled "SYSTEM AND METHOD FOR RADIO FREQUENCY FINGERPRINTING," the contents of which are incorporated by reference herein in their entirety.

FIELD OF THE INVENTION

The present invention relates generally to systems of wireless communication. More specifically, the present invention relates to radio frequency (RF) fingerprinting.

BACKGROUND OF THE INVENTION

Currently available protocols of wireless communication such as the 802.11 protocol, the Wi-Fi protocol, the Long Term Evolution (LTE) protocol, the Orthogonal Frequency Division Multiplexing (OFDM) protocol, and the like may facilitate communication between wireless communication devices, that may include multiple transmission and/or reception antennas. This plurality of antennas may be organized in what is commonly referred to as antenna arrays.

Such wireless communication protocols may implement a technique, or process commonly referred to as "beamforming". In this context, the term "beamforming" may be used herein to refer to controlling and/or combining elements (e.g., antennas) in an antenna array, such that signals at particular spatial angles may experience constructive interference, while others may experience destructive interference. Beamforming can be used at both the transmitting and receiving ends in order to achieve spatial selectivity, and improve a signal-to-noise ratio (SNR) of the transferred signal.

The beamforming technique is typically based upon transfer of information between a first wireless communication device, commonly referred to as a beamformee, and a second communication device, commonly referred to as a beamformer.

In cases of beamforming, the beamformee device is typically configured to sample, and assess or estimate conditions of, a communication channel between the beamformee and beamformer. The beamformer device is typically configured to receive partial information, or a version of the information, pertaining to the channel estimation from the beamformee, and apply an appropriate beamforming configuration on an antenna array, based on the received information. This transfer of information between the beamformee and beamformer may be referred to herein as a "beamforming protocol", which may be part of a standard wireless communication protocol (e.g., 802.11).

It should be noted that currently available beamforming protocols typically do not transfer all the channel estimation data, as calculated by the beamformee (e.g., in the form of a Channel Status Information (CSI) matrix) from the beamformee device to the beamformer device. Instead, a compressed version of the channel estimation data may be transferred over the wireless communication channel, via standard beamforming protocol dataframes or packets, to the beamformer device.

Wireless networks supporting wireless communication protocols (e.g., 802.11, Wi-Fi, LTE, fifth generation (5G), etc.) may include an Access Point (AP) device, or base station device, that may communicate with one or more mobile devices, commonly referred to as mobile station devices (STAs) or user end (UE) devices. The AP may be coupled to a network, such as the Internet, and may enable one or more STAs to communicate via the wireless network (e.g., a Wi-Fi network) to the Internet. Online services may require identification (e.g., user identification) and/or authentication of the connected STAs. This process may require, for example, exchanging of encrypted identification and authentication information between the STAs and AP, and may therefore depend on successful interaction between the connected parties. Therefore, a method of robust STA identification that may not require interaction between the STAs and AP may be desired.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, tools and methods which are meant to be exemplary and illustrative, not limiting in scope.

Currently available wireless communication systems may employ Radio Frequency (RF) fingerprinting of devices for security and identification purposes. The term RF fingerprinting may be used herein to refer to a technology of uniquely identifying a wireless communication device at the physical level, using only external, RF feature measurements. The term thus refers to idiosyncratic inherent traits, characteristics, and/or features of an individual RF device. These small differences are device-specific, even among devices of the same model, and manifest themselves as artifacts of emitted signals. They may be attributed to, e.g., component manufacturing tolerances, device age, etc. In some cases, these traits, characteristics, and/or features may be sufficiently unique, either individually or in combination, that they can be used to identify that device. Because RF fingerprints are difficult to clone, they may be exploited to obtain reliable and efficient electronic fingerprints and signatures from RF devices. These, in turn, may play a significant role in improving the security of many RF transmission protocols, e.g., for identification and authentication purposes.

Currently available systems may, for example, access CSI data, that may encapsulate the physical properties of a communication channel between a beamformer device and beamformee device, to produce an RF fingerprint of a connected wireless communication device. Currently available systems may subsequently identify the connected wireless communication device based on the RF fingerprint.

However, it may be appreciated that such methods of RF fingerprinting may not be robust; CSI data is typically kept or stored in a memory of a wireless communication device (e.g., a wireless router of an AP), and may not be readily accessible to an entity requiring RF fingerprinting. In addition, CSI data is not normally transmitted between the beamformee and beamformer over the wireless channel, and is therefore not normally available by monitoring the communication channel.

For example, CSI data may be accessible via a proprietary software patch that may be applied to Wi-Fi communication cards, or via Application Programming Interfaces (APIs)

that may be provided by Wi-Fi silicon providers, but most currently deployed APs do not support access to physical layer data.

Embodiments of the invention may use standard 802.11 beamforming protocol dataframes or packets as a data source for RF fingerprinting of wireless communication devices. It may be appreciated that such beamforming protocol dataframes may include data elements that are derived from, or correlate to physical layer data, including for example channel estimation information (e.g., CSI), but is nevertheless: (i) accessible, as it is transmitted over the wireless channel as part of a standard beamforming protocol, and (ii) not equivalent to the channel estimation information, in a sense that one may not be able to reproduce channel estimation information (e.g., CSI) from data included in the standard 802.11 beamforming protocol dataframes or packets.

Embodiments of the present invention may include a method of radio frequency fingerprinting by at least one computing device. Embodiments of the method may include monitoring transmissions representing estimation of a wireless channel, between a wireless AP and at least one wireless STA; calculating at least one feature vector from the monitored transmissions; producing a fingerprint representing the at least one STA, based on the calculated feature vector; and identifying the at least one STA from a plurality of STAs, based on the produced fingerprint.

For example, the monitored transmissions may be or may include beamforming protocol dataframes or packets (e.g., single-user and/or multiple user "compressed beamforming action frames"), as defined by the 802.11 wireless protocol, and the at least one feature vector may be calculated from the dataframes of the standard beamforming protocol, as elaborated herein.

According to some embodiments, calculating the at least one feature vector may include extracting angle parameters from the dataframes of the standard beamforming protocol; calculating at least one pre-steering matrix, based on the extracted angle parameters; and producing, from the at least one pre-steering matrix, a feature vector that may include a plurality of entries, where each feature vector entry may represent steering data pertaining to at least one of: (i) a specific subcarrier of the wireless channel, (ii) a specific antenna of the AP, and (iii) a specific antenna of the STA. It may be appreciated by a person skilled in the art that the computing device of the present invention may not normally have access to channel state information (CSI) that may be stored on the beamformer (e.g., AP).

Additionally, or alternatively, in embodiments where the at least one computing device of the present invention does have access to CSI information that may be stored on the beamformer (e.g., AP), the computing device may read, from a memory device associated with the AP, at least one data element pertaining to CSI. The at least one computing device may subsequently monitor transmission of dataframes of a standard beamforming protocol on the wireless channel; extract angle parameters from the monitored dataframes; and calculate the at least one feature vector based on the angle parameters and the at least one CSI data element.

According to some embodiments, the at least one computing device may monitor one or more first dataframes of a standard beamforming protocol sent from the AP; extract a first set of angle parameters from the one or more first dataframes; monitor one or more second dataframes of the standard beamforming protocol sent from the STA; extract a second set of angle parameters from the one or more second dataframes; and calculate the at least one feature vector based on the first set of angle parameters and second set of angle parameters.

According to some embodiments, identifying the at least one STA may include: introducing at least one feature vector, corresponding to the at least one STA to a machine-learning (ML) based model, trained to identify the at least one STA based on the at least one feature vector; and obtaining from the ML model a channel-invariant prediction of an identification of the at least one STA.

For example, the ML model may include a feature extraction portion, adapted to produce a channel-invariant fingerprint of the at least one STA; and a prediction portion, adapted to predict the identification of the at least one STA based on the channel-invariant fingerprint.

According to some embodiments, the at least one computing device may train the ML model to identify the at least one STA by: providing one or more annotated feature vectors as input data to the ML model; and training the ML model to identify at least one STA based on the annotated feature vectors. For example, each annotated feature vector may be associated with an annotation representing an identification of an STA. Thus, training the ML model may include using the annotations as supervisory data.

According to some embodiments, a first annotated feature vector may be calculated from a beamforming dataframe corresponding to a first position of the at least one STA, in relation to the AP (e.g., relative distance and/or direction of a beamformee in relation to a beamformer), as elaborated herein. Additionally, at least one second annotated feature vector may be calculated from at least one beamforming dataframe corresponding to at least one respective second, different position of the at least one STA, in relation to the AP, as elaborated herein.

Additionally, or alternatively, a first annotated feature vector may be calculated from a beamforming dataframe corresponding to a first set of channel condition values (e.g., fading,), and wherein a second annotated feature vector may be calculated from a beamforming dataframe corresponding to a second set of channel condition values. For example, the sets of channel condition values may pertain to properties of a medium of the wireless channel, such as RF reflections from intervening objects (e.g., "multipaths"), temperature, humidity, etc., and/or properties of motion, such as speed, fading effect, doppler effect, etc.

Embodiments of the present invention may include a system for radio frequency fingerprinting. Embodiments of the system may include a non-transitory memory device, wherein modules of instruction code may be stored, and at least one processor associated with the memory device, and configured to execute the modules of instruction code. Upon execution of the modules of instruction code, the at least one processor may be configured to monitor transmissions representing estimation of a wireless channel, between a wireless beamformer (e.g., AP) and at least one wireless beamformee (e.g., STA); calculate at least one feature vector from the monitored transmissions; produce a fingerprint representing the at least one STA, based on the calculated feature vector; and identify the at least one STA from a plurality of STAs, based on the produced fingerprint.

Embodiments of the present invention may include a method of radio frequency fingerprinting by at least one computing device. Embodiments of the method may include monitoring transmissions in a wireless network representing estimation of a wireless channel, between at least one beamformee and a beamformer; calculating at least one feature vector from the monitored transmissions; producing a fingerprint representing the at least one beamformee, based on the calculated feature vector; and identifying the at least one beamformee from a plurality of beamformee devices, based on the fingerprint.

According to some embodiments, the monitored transmissions may include dataframes of a standard beamforming protocol, and wherein the at least one feature vector may be calculated from the dataframes of the standard beamforming protocol.

According to some embodiments, calculating the at least one feature vector may include: extracting angle parameters from the dataframes of the standard beamforming protocol; calculating at least one pre-steering matrix, based on the extracted angle parameters; and producing, from the at least one pre-steering matrix, a feature vector that may include a plurality of entries, where each feature vector entry may represent steering data. The steering data may pertain to at least one of: (i) a specific subcarrier of the wireless channel, (ii) a specific antenna of the beamformer, and/or (iii) a specific antenna of the at least on beamformee.

According to some embodiments, the at least one computing device may identify the at least one beamformee by introducing at least one feature vector, corresponding to the at least one beamformee to an ML-based model, trained to identify the at least one beamformee based on the at least one feature vector; and obtaining from the ML model a channel-invariant prediction of an identification of the at least one beamformee. The ML model may, for example, include a feature extraction portion, adapted to produce a channel-invariant fingerprint of the at least one beamformee; and a prediction portion, adapted to predict the identification of the at least one beamformee, based on the channel-invariant fingerprint.

According to some embodiments, the at least one computing device may train the ML model to identify the at least one beamformee by providing one or more annotated feature vectors as input data to the ML model; and training the ML model to identify at least one beamformee based on the annotated feature vectors.

According to some embodiments, a first annotated feature vector may be calculated from a beamforming dataframe may correspond to a first position of the at least one beamformee, in relation to the beamformer, and wherein at least one second annotated feature vector may be calculated from at least one beamforming dataframe corresponding to at least one respective second position of the at least one beamformee, in relation to the beamformer.

According to some embodiments, a first annotated feature vector may be calculated from a beamforming dataframe corresponding to a first set of channel condition values, and a second annotated feature vector may be calculated from a beamforming dataframe corresponding to a second set of channel condition values, as elaborated herein.

According to some embodiments, the dataframes of the standard beamforming protocol may be selected from a single user (SU) compressed beamforming action frame, and/or a multiple user (MU) compressed beamforming action frame, as defined in the 802.11 communication standard.

Additionally, or alternatively, the at least one computing device may calculate the at least one feature vector by: extracting one or more subcarrier-specific signal to noise ratio (SNR) values from the dataframes of the standard beamforming protocol; and producing a feature vector that may include the one or more subcarrier-specific SNR values.

Additionally, or alternatively, the at least one computing device may calculate the at least one feature vector by: extracting a value of one or more data elements from an "MU exclusive beamforming report" field of the dataframes of the standard beamforming protocol; and producing a feature vector that may include the value of the one or more data elements of the "MU exclusive beamforming report" field.

Additionally, or alternatively, the at least one computing device may calculate the at least one feature vector by: extracting a value of one or more data elements from a "Very High Throughput (VHT) Multiple-input-multiple-output (MIMO) control" field of the dataframes of the standard beamforming protocol; and producing a feature vector that may include the value of the one or more data elements of the "VHT MIMO control" field.

Further embodiments of the present invention include a system comprising at least one hardware processor; and a non-transitory computer-readable storage medium having stored thereon program instructions, the program instructions executable by the at least one hardware processor to: monitor wireless data transmissions representing estimation of a wireless channel, between at least one wireless access point (AP) and a plurality of wireless stations (STAs), at a training stage, train a machine learning model on a training dataset comprising: (i) a plurality dataframes of a standard beamforming protocol associated with at least some of the monitored transmissions, and labels indicating an association between the dataframes and the STAs, and at an inference stage, apply the trained machine learning model to a target wireless data transmission representing estimation of a wireless channel, to predict whether the target wireless data transmission was transmitted from one of the STAs.

Further embodiments of the present invention also include computer-implemented method comprising: monitoring wireless data transmissions representing estimation of a wireless channel, between at least one wireless access point (AP) and a plurality of wireless stations (STAs); at a training stage, training a machine learning model on a training dataset comprising: (i) a plurality dataframes of a standard beamforming protocol associated with at least some of the monitored transmissions, and (ii) labels indicating an association between the dataframes and the STAs; and at an inference stage, applying the trained machine learning model to a target wireless data transmission representing estimation of a wireless channel, to predict whether the target wireless data transmission was transmitted from one of the STAs.

In some embodiments, the training dataset comprises a plurality of feature vectors associated with at least some of the transmissions, (i) in addition to the plurality of dataframes, or (ii) in lieu of the plurality of dataframes.

In some embodiments, each of the feature vectors is calculated from the dataframes associated with the at least some of the transmissions, by: (i) extracting angle parameters from the dataframes; (ii) calculating at least one pre-steering matrix, based on the extracted angle parameters; and (iii) producing, from the at least one pre-steering matrix, the feature vector.

In some embodiments, the calculating further comprises: (i) obtaining, from a memory device associated with the at least one AP, at least one data element pertaining to Channel Status Information (CSI) associated with the dataframes; and (ii) calculating the feature vector based on the angle parameters and the at least one CSI data element.

In some embodiments, the labels are binary and indicate whether or not each of the dataframes and/or feature vectors is associated with a specific one of the plurality of the STAs.

In some embodiments, the labels are multi-class and indicate an association between each of the dataframes and/or feature vectors and one of a subset of the STAs.

In some embodiments, the labels further include, with respect to each of the dataframes and/or feature vectors, indication of one of the following operational parameters: STA operating temperature, AP operating temperature, and signal-to-noise (SNR) ratio value of a signal associated with the dataframe and/or feature vector.

Further embodiments of the present invention include a computer-implemented method comprising: monitoring wireless data transmissions representing estimation of a wireless channel, between multiple pairings selected from among a plurality of wireless access points (APs) and a plurality of wireless stations (STAs); at a training stage, training a machine learning model on a training dataset comprising: (i) a plurality dataframes of a standard beamforming protocol associated with the monitored transmissions, and (ii) labels indicating a CFO value associated with each of the monitored transmissions; and at an inference stage, applying the trained machine learning model to a target wireless data transmission representing estimation of a wireless channel, between a target STA and AP, to predict a CFO value associated with the target wireless data transmission.

In some embodiments, the training dataset comprises a plurality of feature vectors associated with at least some of the transmissions, (i) in addition to the plurality of dataframes, or (ii) in lieu of the plurality of dataframes.

In some embodiments, each of the feature vectors is calculated from the dataframes associated with the at least some of the transmissions, by: (i) extracting angle parameters from the dataframes; (ii) calculating at least one pre-steering matrix, based on the extracted angle parameters; and (iii) producing, from the at least one pre-steering matrix, the feature vector.

In some embodiments, the calculating further comprises: (i) obtaining, from a memory device associated with said at least one AP, at least one data element pertaining to Channel Status Information (CSI) associated with said dataframes; and (ii) calculating said feature vector based on the angle parameters and the at least one CSI data element.

In some embodiments, the labels further include, with respect to each of said dataframes and/or feature vectors, indication of one of the following operational parameters: STA operating temperature, AP operating temperature, and signal-to-noise (SNR) ratio value of a signal associated with said dataframe and/or feature vector.

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION OF THE PRESENT INVENTION

Disclosed herein is a technique, embodied as a system, a computer-implemented method, and a computer program product for RF fingerprinting of a wireless communication device, based on features extracted from beamforming protocol dataframes transmitted over a communications channel between the wireless device ("beamformee") and a second communication device ("beamformer").

In some embodiments, the present technique may be used in the context of a wireless communications network, for identifying and authenticating network devices. For example, when a new device first joins the network, one or more existing network nodes may perform a training stage for constructing an RF fingerprint for the new device. The RF fingerprint may then be stored, together with all other existing network RF fingerprints, in a network-accessible database of authorized RF fingerprints. Thereafter, whenever the device attempts to connect to the network, the stored RF fingerprint of the device will be matched against a runtime RF fingerprint acquired from the device, to permit or deny network service or login to the device.

Figure 1:
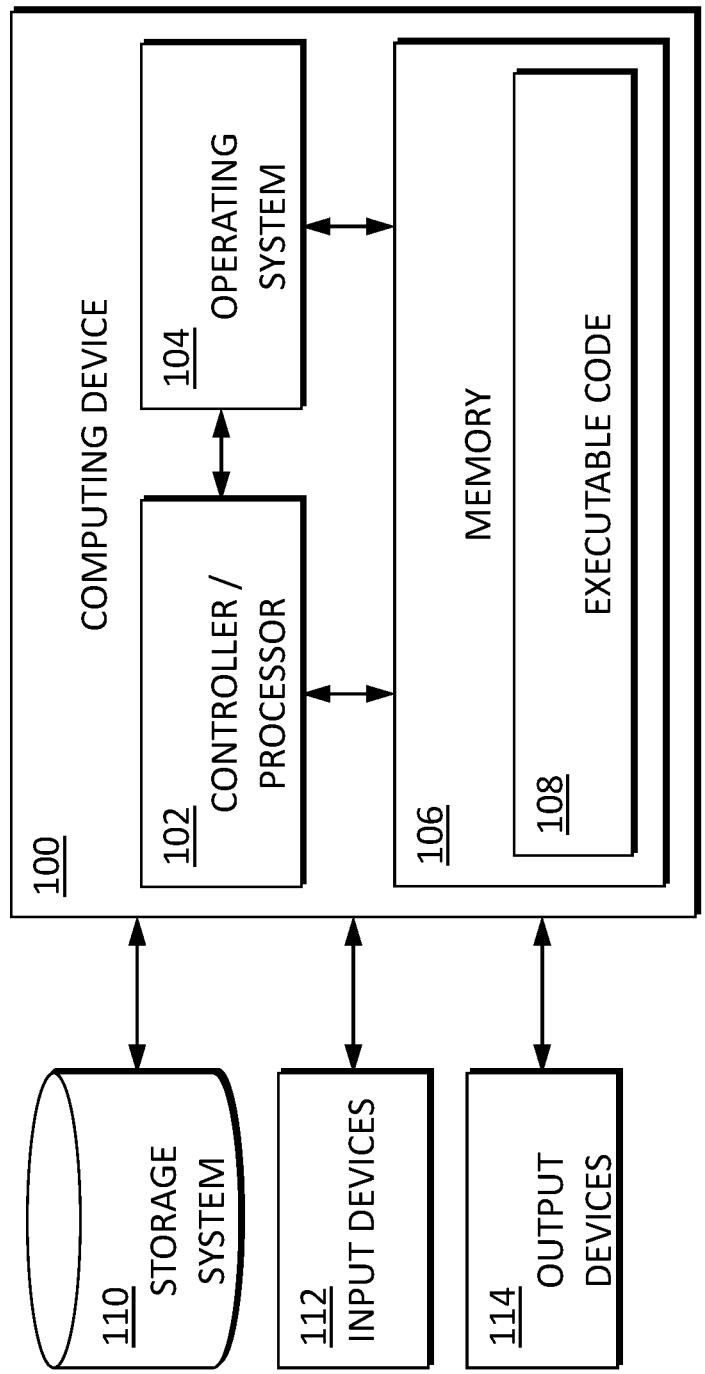
FIG. 1 is a block diagram depicting a computing device which may be included in a system for RF fingerprinting, according to some embodiments of the invention.

Reference is made to FIG. 1, which is a block diagram depicting a computing device, which may be included within an embodiment of a system for RF fingerprinting of a wireless communication device, according to some embodiments.

Computing device 100 may include a processor or controller 102 that may be, for example, a central processing unit (CPU) processor, a chip or any suitable computing or computational device, an operating system 104, a memory 106, executable code 108, a storage system 312, input devices 112 and output devices 114. Processor 102 (or one or more controllers or processors, possibly across multiple units or devices) may be configured to carry out methods described herein, and/or to execute or act as the various modules, units, etc. More than one computing device 100 may be included in, and one or more computing devices 100 may act as the components of, a system according to embodiments of the invention.

Operating system 104 may be or may include any code segment (e.g., one similar to executable code 108 described herein) designed and/or configured to perform tasks involving coordination, scheduling, arbitration, supervising, controlling or otherwise managing operation of computing device 100, for example, scheduling execution of software programs or tasks or enabling software programs or other modules or units to communicate. Operating system 104 may be a commercial operating system. It will be noted that an operating system 104 may be an optional component, e.g., in some embodiments, a system may include a computing device that does not require or include an operating system 104.

Memory 106 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 106 may be or may include a plurality of possibly different memory units. Memory 106 may be a computer or processor non-transitory readable medium, or a computer non-transitory storage medium, e.g., a RAM. In one embodiment, a non-transitory storage medium such as memory 106, a hard disk drive, another storage device, etc. may store instructions or code which when executed by a processor may cause the processor to carry out methods as described herein.

Executable code 108 may be any executable code, e.g., an application, a program, a process, task or script. Executable code 108 may be executed by processor or controller 102 possibly under control of operating system 104. For example, executable code 108 may be an application that may perform RF fingerprinting as further described herein. Although, for the sake of brevity, a single item of executable code 108 is shown in FIG. 1, a system according to some embodiments of the invention may include a plurality of executable code segments similar to executable code 108 that may be loaded into memory 106 and cause processor 102 to carry out methods described herein.

Storage system 312 may be or may include, for example, a flash memory, a memory that is internal to, or embedded in, a micro controller or chip, a hard disk drive, a CD-Recordable (CD-R) drive, a Blu-ray disk (BD), a universal serial bus (USB) device or other suitable removable and/or fixed storage unit. Data pertaining to a wireless communication channel may be stored in storage system 312 and may be loaded from storage system 312 into memory 106 where it may be processed by processor or controller 102. In some embodiments, some of the components shown in FIG. 1 may be omitted. For example, memory 106 may be a non-volatile memory having the storage capacity of storage system 312. Accordingly, although shown as a separate component, storage system 312 may be embedded or included in memory 106.

Input devices 112 may be or may include any suitable input devices, components or systems, e.g., a detachable keyboard or keypad, a mouse and the like. Output devices 114 may include one or more (possibly detachable) displays or monitors, speakers and/or any other suitable output devices. Any applicable input/output (I/O) devices may be connected to Computing device 100. For example, a wired or wireless network interface card (NIC), a universal serial bus (USB) device or external hard drive may be included in input devices 112 and/or output devices 114. It will be recognized that any suitable number of input devices 112 and output device 114 may be operatively connected to Computing device 100.

A system according to some embodiments of the invention may include components such as, but not limited to, a plurality of central processing units (CPU) or any other suitable multi-purpose or specific processors or controllers (e.g., similar to processor 102), a plurality of input units, a plurality of output units, a plurality of memory units, and a plurality of storage units.

A neural network (NN) or an artificial neural network (ANN), e.g., a neural network implementing a machine learning (ML) or artificial intelligence (AI) function, may refer to an information processing paradigm that may include nodes, referred to as neurons, organized into layers, with links between the neurons. The links may transfer signals between neurons and may be associated with weights. a NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. a processor, e.g., CPUs or graphics processing units (GPUs), or a dedicated hardware device may perform the relevant calculations.

Figure 2:
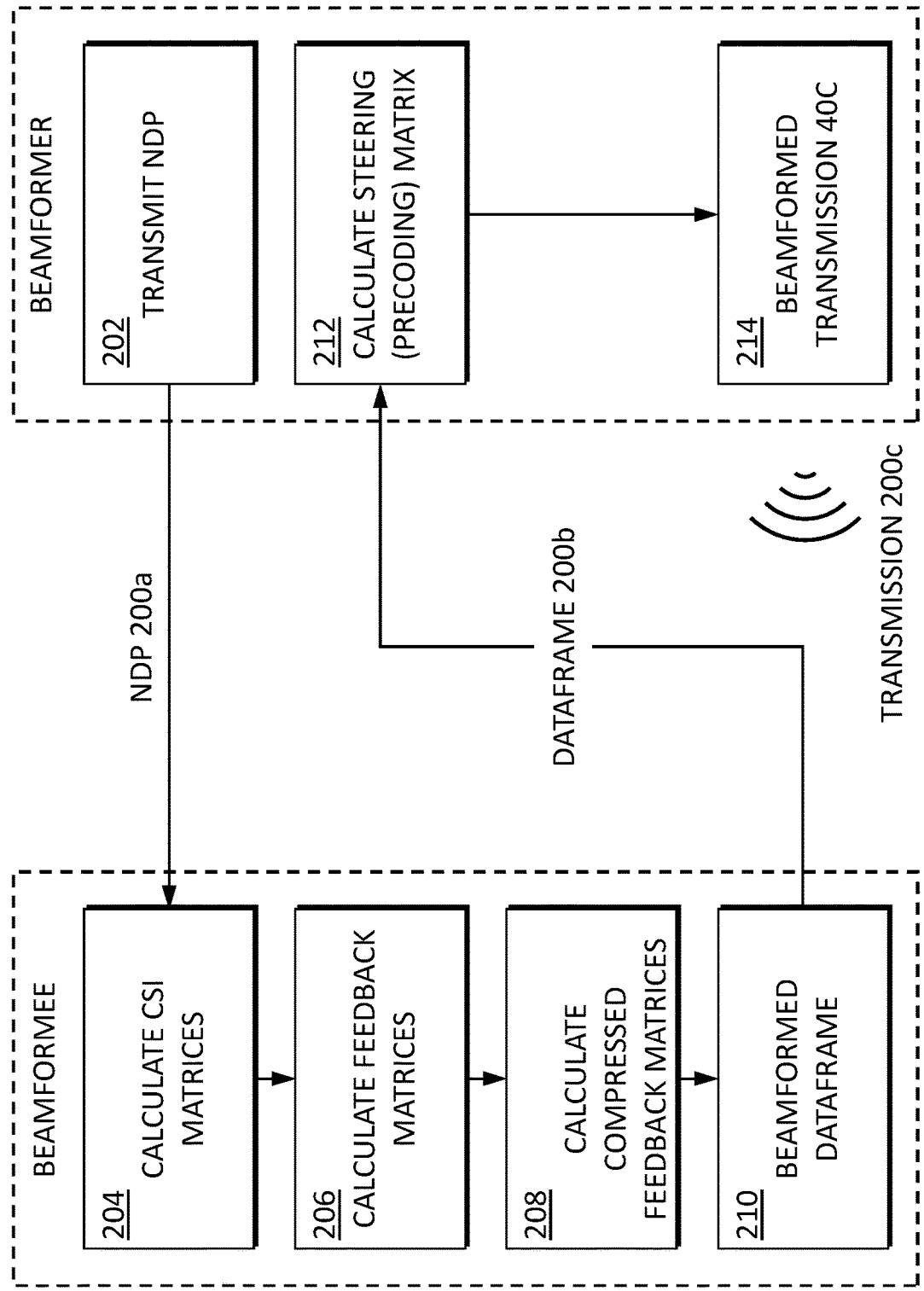
FIG. 2 is a schematic diagram depicting a process of beamforming.

Reference is now made to FIG. 2, which is a schematic diagram depicting a simplified example of a process of beamforming (e.g., as implemented according to the 802.11 standard).

As shown in block 202, a beamformer device, such as an AP, may transmit a Null Data Packet (NDP, denoted herein as NDP 200a) to a beamformee (e.g., an STA device) over a wireless channel. Transmitted NDP packet 200a typically includes one or more channel training fields.

The values of the channel training fields are typically set such that a receiving beamformee device will be able to analyze the channel training fields, to calculate one or more channel response matrices, commonly referred to in the art as H matrices or CSI matrices, as shown in block 204. The channel response matrices or CSI matrices may represent physical properties of a communication channel between the beamformer device and beamformee device.

For example, the wireless communication protocol may be an OFDM protocol, that may encode digital data on multiple carrier frequencies, each commonly referred to in the art as an OFDM subcarrier. In such implementations, a beamformee (e.g., STA device) may receive the NDP 200a packet, and subsequently process the training field of each of the plurality of OFDM subcarriers in the NDP frame independently, to produce a respective plurality of dedicated CSI matrices or H matrices. Each such dedicated CSI matrix or H matrix may describe the channel of a subcarrier between each transmitter antenna element and each receiver antenna element. The beamformee may compute the value of entries of each CSI matrix entries based on the received signal power and phase shifts between each pair (e.g., transmission and reception) of antennas.

As shown in block 206, the beamformee (e.g., STA device) may apply Singular Value Decomposition (SVD) on one or more (e.g., each) CSI matrix, into eigen components to produce one or more respective "feedback" matrices, or V matrices, as referred to in the 802.11 standard. For example, the beamformee may perform the SVD decomposition according to equation Eq. 1 below:

$$H_{(N \times M)} = U_{(N \times N)} S_{(N \times M)} V^H_{(M \times M)}$$

where
- H is the 2-dimensional (2D) CSI matrix, or channel matrix, as commonly referred to in the art;
- U is unitary matrices of size (N×N), where N is a predefined value;
- S is a diagonal matrix of singular values;
- V is a unitary "feedback" matrix, or "transmit weighing matrix" as commonly referred to in the art, of size (M×M), where M is a predefined value; and
- $V^H$ is the Hermitian (e.g., complex conjugate transpose) of V.

It may be appreciated that feedback matrix V may be obtained from its Hermitian form $V^H$. Feedback matrix V may subsequently serve as basis for calculation of the weights that should be applied to the transmit streams on the beamformer device.

As shown in block 208, the beamformee (e.g., STA device) may produce a compressed form (denoted herein as $V^c$) of the one or more (e.g., each) feedback matrices V. The beamformee may decompose feedback matrix V into polar values, by applying a Givens rotation matrix, so as to limit the number of data bits required for presenting feedback matrix V values. For example, the beamformee may produce a polar representation of feedback matrix V according to equation Eq. 2 below:

$$V = \left[ \prod_{i=1}^{\min(N_c, N_r-1)} \left[ D_i \left( 1_{i-1} e^{j\phi_{i,i}} \ldots e^{j\phi_{N_r-1,i}} 1 \right) \prod_{l=i+1}^{N_r} G_{li}^T(\psi_{li}) \right] \right] \tilde{I}_{N_r \times N_c}$$

where:
- $N_r$ and $N_c$ are predefined values;
- I is an identity matrix of size ($N_r \times N_c$);
- $\phi$ and $\psi$ are quantized, angular coordinates
- $G_{li}$ is the Givens rotation matrix, and $G_{li}^T$ is the transpose of $G_{li}$; and
- $D_i$ is a diagonal matrix derived for feedback matrix V such that the elements of column i of $D_i \times V$ are all non-negative real numbers, given by equation Eq. 3 below:

$$D_i = \begin{bmatrix} I_{i-1} & 0 & \ldots & \ldots & 0 \\ 0 & e^{j\phi_{i,i}} & 0 & \ldots & 0 \\ \vdots & 0 & \ddots & 0 & \vdots \\ \vdots & \vdots & 0 & e^{j\phi_{M-1,i}} & 0 \\ 0 & 0 & \ldots & 0 & 1 \end{bmatrix}$$

The beamformee may produce, from the one or more feedback matrices V, a second version of feedback matrix V, denoted herein as a pre-steering matrix, or matrix $\tilde{V}$, based on equation Eq. 4 below:

$$\tilde{V} = V^* D$$

where:
- $\tilde{V}$ is the pre-steering matrix;
- V is the feedback matrix as elaborated herein (e.g., in Eq. 2); and D is defined as in Eq. 5 below:

$$D_i = \begin{bmatrix} e^{j\theta_1} & 0 & \ldots & \ldots & 0 \\ 0 & e^{j\theta_2} & 0 & \ldots & 0 \\ \vdots & 0 & \ddots & 0 & \vdots \\ \vdots & \vdots & 0 & e^{j\theta_{N-1}} & 0 \\ 0 & 0 & \ldots & 0 & e^{j\theta_N} \end{bmatrix}$$

The beamformee (e.g., STA device) may produce a compressed form $V^c$ of feedback matrix $\tilde{V}$, that may be comprised of feedback angles $\phi_{(1,i)}$ and $\psi_{(1,i)}$, denoted herein as "feedback angle parameters 200b'" or "angle parameters 200b'" for short.

As shown in block 210, the beamformee may transmit a beamforming dataframe 200b (e.g., referred to as a "compressed beamforming action frame" in the 802.11 standard) to the beamformer, that includes the compressed form $V^c$ of feedback matrix $\tilde{V}$.

It should be emphasized that currently available wireless communication systems transmit these angle parameters 200b' from the beamformee to the beamformer, as a compressed form $V^c$ of the feedback V matrix, in the compressed beamforming action frame. Currently available wireless communication systems do not normally transmit the feedback matrix V, or the channel estimation matrix (also referred to as the "H matrix" or "CSI matrix") between the beamformee and the beamformer.

As shown in block 212, the beamformer (e.g., AP device) may receive beamforming dataframe 200b including $V^c$, and may produce therefrom a steering matrix (commonly referred to as a 'Q' matrix or precoding matrix), that includes values of gain (or attenuation) and phase shift, to be applied to one or more (e.g., each) element (e.g., antenna, operational amplifier, etc.) in its antenna array.

As shown in block 214, the beamformer may apply the steering matrix (or precoding matrix or 'Q' matrix) on RF signals (e.g., transmitted RF signals), to produce beamformed transmission 200c of data over the wireless communication channel.

Figure 3A:
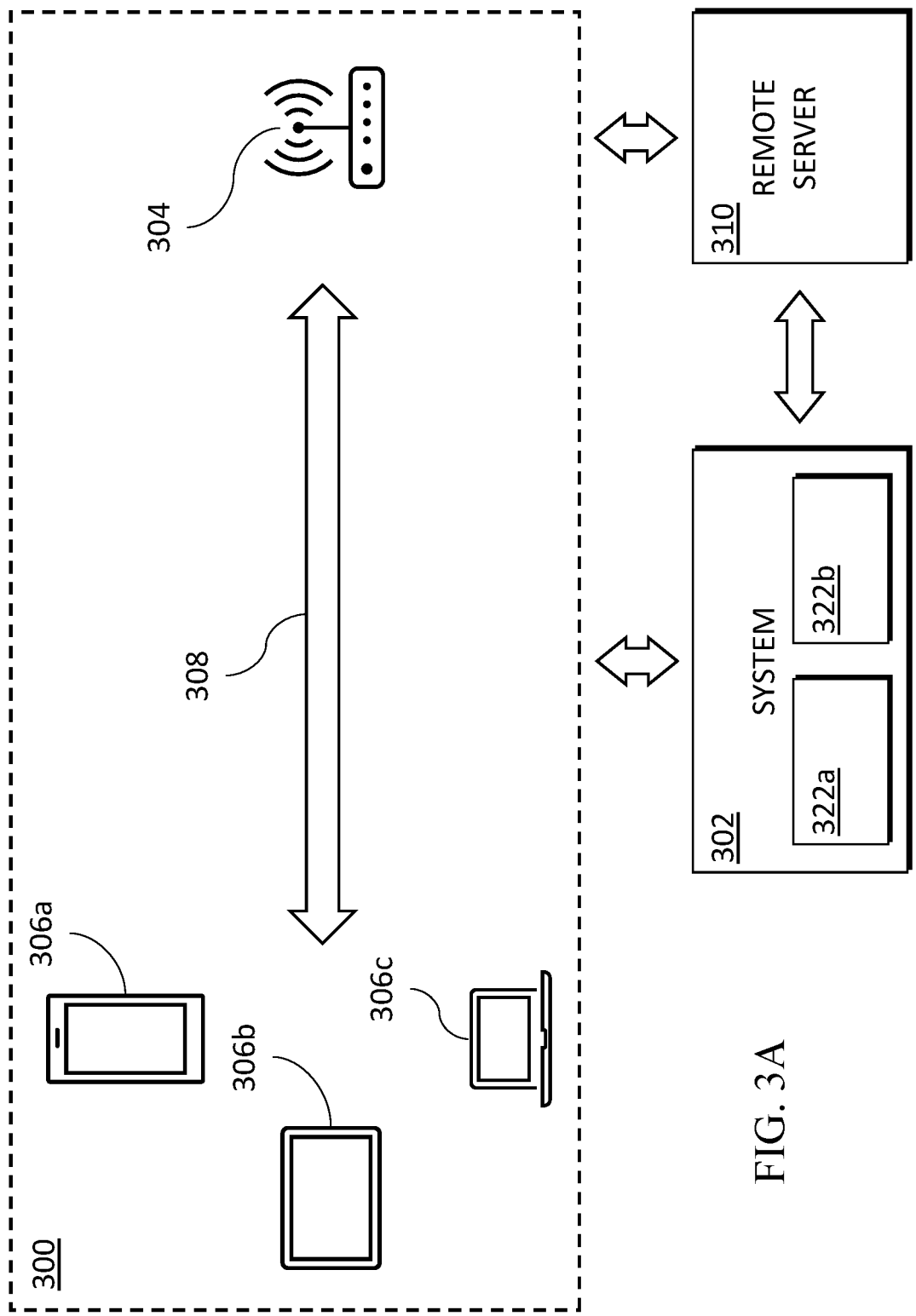
FIG. 3A is a schematic block diagram depicting a wireless network configuration which may include a system for RF fingerprinting, according to some embodiments of the invention.

Reference is now made to FIG. 3A, which is a schematic block diagram depicting a configuration of a wireless communication network or wireless communication channel 300 which may include a system 302 for RF fingerprinting, according to some embodiments of the invention. As shown in FIG. 3A, arrows may represent flow of one or more data elements to and from nodes within wireless communication channel 300 and/or system 302. Some arrows have been omitted in FIG. 3A for the purpose of clarity.

According to some embodiments of the invention, system 302 may be implemented as a software module, a hardware module, or any combination thereof. In a non-limiting example, the present technique provides for modifying wireless communication network 300 to incorporate the present technique. For example, the present technique may be implemented as a software agent integrated into any node of wireless communication network 300, for example, within AP 304 or otherwise. In another example, a system 302 may be or may include a computing device such as computing device 100 of FIG. 1, and may be adapted to execute one or more modules of executable code (e.g., executable code 108 of FIG. 1) to perform RF fingerprinting and/or identification of one or more wireless communication devices within wireless communication network 300, as further described herein.

As shown in FIG. 3A, system 302 may be configured to monitor transmissions of RF signals (e.g., transmissions for short), which may be conveyed over wireless network 300, for example between one or more beamformee devices (e.g., one or more of STA devices 306a-306c) and at least one beamformer device (e.g., an AP device 304 such as a wireless router, a wireless switch, a base station, and the like). In some embodiments, system 302 may be configured to receive and/or monitor RF transmissions 308 that may represent or include data pertaining to estimation of a network 300, between the at least one beamformer (e.g., AP 304 device) and the one or more beamformee devices (e.g., STAs 306a-306c). For example, the received or monitored RF transmissions 308 may be or may include a compressed beamforming action frame, as elaborated herein (e.g., in relation to FIG. 2).

According to some embodiments of the invention, system 302 may calculate at least one feature vector from the monitored transmissions 308, and may produce an RF fingerprint 312A representing at least one beamformee device (e.g., an STA device corresponding to the received RF transmission 200b), based on the calculated feature vector, as elaborated herein.

It may be appreciated that an RF fingerprint may be used to singularly identify or label at least one beamformee device (e.g., any one of STAs 306a, 306b, 306c) from the plurality of beamformee devices (e.g., plurality of STAs 306a-306c).

For example, and as shown in FIG. 3A, system 302 and/or AP 304 may be communicatively connected to a remote server 310 via a communication network such as the Internet. For example, remote server 310 may provide online services to at least one beamformee device (e.g., STAs 306a-306c) of the one or more beamformee devices (e.g., STAs 306a-306c), and may require a unique identification 322b for that purpose. System 302 may analyze an RF fingerprint 322a pertaining to the at least one beamformee device (e.g., STAs 306a-306c), to produce a label of identification 322b (or "identification 322b" for short), such as a unique identification number, a unique identification string and the like. System 302 may then send or transmit identification 322b to AP 304 and/or remote server 310 (e.g., via network 300 and/or via the Internet), so as to identify the respective beamformee device (e.g., STAs 306a-306c) vis-à-vis the online service of remote server 310.

Figure 3B:
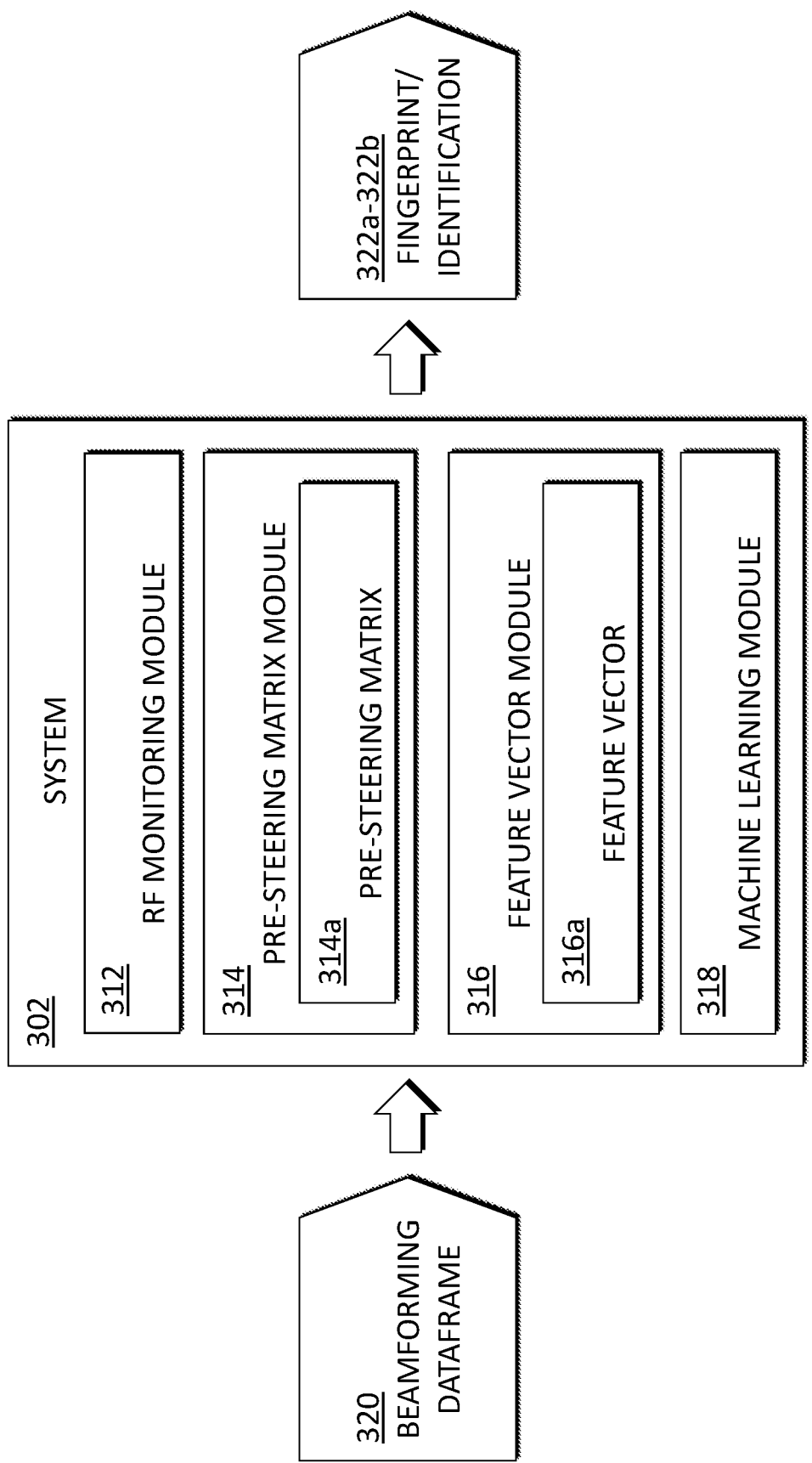
FIG. 3B is a block diagram depicting a system for RF fingerprinting, according to some embodiments of the invention.

Reference is now made to FIG. 3B, which is a block diagram depicting system 302 for RF fingerprinting, according to some embodiments of the invention. It may be appreciated that system 302 of FIG. 3B may be the same as system 302 of FIG. 3A.

As shown in FIG. 3B, system 302 may include an RF monitoring module 312, that may be configured to receive and/or monitor RF transmissions over a wireless channel between a beamformer device (e.g., AP) and at least one beamformee device (e.g., STA). For example, as elaborated herein (e.g., in relation to FIG. 2 and/or FIG. 3A), RF monitoring module 312 may receive from a beamformee (e.g., an STA 306a-306c or an AP 304) one or more beamforming dataframes or packets (200b as shown in FIG. 2) of a standard beamforming protocol, that may represent information that is derived from a calculated channel estimation matrix. For example, the one or more beamforming dataframes 200b may be a compressed beamforming action frame (e.g., as referred to by the 802.11 standard), and may include one or more angle parameters 200b', as elaborated herein.

As shown in FIG. 3B, system 302 may include a pre-steering matrix module 314 (or "pre-steering matrix module 314" for short), and a feature vector generation module 316 (or "feature vector module 316" for short).

In some embodiments, the wireless communication channel 300 may be an OFDM communication channel 300, and the beamformee (e.g., STA 306a-306c) may send one or more (e.g., a plurality) of dataframes 200b that are compressed beamforming action frames. Each dataframe 200b may pertain to one or more subcarriers of the OFDM communication channel. Pre-steering module 314 may utilize equation Eq. 2 to obtain a reproduced version of feedback matrix $\tilde{V}$, for each OFDM subcarrier. These subcarrier-specific reproduced versions of $\tilde{V}$ are denoted herein as one or more pre-steering matrices 314a.

According to some embodiments, system 302 may utilize pre-steering matrix module 314 and feature vector module 316 to calculate at least one feature vector 316a from the dataframes 200b of the standard beamforming protocol, as elaborated herein.

The term "pre-steering" may be used herein to indicate that the subcarrier-specific reproduced versions of $\tilde{V}$ may be used by a beamformer, to produce a steering matrix (e.g., a 'Q' matrix or "precoding" matrix), and as explained herein (e.g., in relation to block 212 of FIG. 2).

It may be appreciated that pre-steering matrices 314a may be substantially identical to steering matrices (commonly referred to as 'Q' matrices), as defined by the 802.11 standard. In other words, pre-steering matrices 314a (or $\tilde{V}$) may include phase and/or gain information, per each subcarrier of the wireless communication channel, that may be used by a beamformer (e.g., AP 304) for steering transmission of signals via each antenna of the antenna array.

Pertaining to the example of the OFDM communication channel 300, feature vector generator module 316 may produce a feature vector 316a based on the plurality of the subcarrier-specific pre-steering matrices 314a, according to equation Eq. 6 below:

$$\text{Feature}_{vector} = \{\text{Re}(\tilde{V}_{1,1}[0]), \ldots, \text{Re}(\tilde{V}_{1,1}[N]), \text{Im}(\tilde{V}_{1,1}[0]), \ldots, \text{Im}(\tilde{V}_{1,1}[N])\}^T$$

where:

Feature$_{vector}$ is feature vector 316a;

$\tilde{V}_{1,1}[0]$ is entry (1,1) of a pre-steering matrix 314a pertaining to subcarrier i;

N is the number of subcarriers; and

Re(·) and Im(·) are the Real and Imaginary components of the relevant pre-steering matrix 314a entries.

Additionally, or alternatively, RF monitoring module 312 may obtain, or extract from dataframes 200b of the standard beamforming protocol, one or more angle parameters 200b' pertaining to one or more subcarriers of the wireless communication channel. Pre-steering module 314 may then calculate at least one pre-steering matrix 314a (e.g., per each subcarrier) based on the extracted angle parameters 200b', according to Eq. 2.

Feature vector module 316 may then calculate, or produce, from the at least one pre-steering matrix 314a, a feature vector 316a that may include a plurality of entries. Each entry of feature vector 316a may represent steering data pertaining to at least one of: (i) a specific subcarrier of the wireless channel, (ii) a specific antenna of a beamformer device (e.g., AP 304), and (iii) a specific antenna of a specific beamformee device (e.g., STA 306).

According to some embodiments, computing device 100 of system 302 may not have access to channel state information (e.g., a CSI matrix) that may be stored on the beamformer device (e.g., AP 304). It may be appreciated that the calculation of feature vector 316a, based on angle parameters 200b' that are transmitted between a beamformee and a beamformer in wireless channel 300, as elaborated herein may overcome this limitation, and may therefore provide an improvement in wireless communication technology, over currently available communication systems.

Additionally, or alternatively, system 302 may have access to channel state information (e.g., a CSI matrix) that may be stored on the beamformer device (e.g., AP 304). For example, system 302 may be implemented in the same computing device 100 as that of the beamformer device (e.g., AP 304), and may therefore read at least one data element of CSI information from a memory or storage device (e.g., memory 106 or storage system 312 of FIG. 1) that may be included in, or associated with the beamformer device. In another example, system 302 may be implemented on a computing device 100 that is communicatively connected (e.g., via Ethernet) to beamformer device (e.g., AP 304), and may obtain the CSI information via appropriate APIs.

In such embodiments, RF monitoring module 312 may monitor transmission of dataframes 200b of the standard beamforming protocol on wireless channel 300, to extract angle parameters 200b' from the monitored dataframes. Feature vector generator module 316 may obtain at least one data element of CSI information from beamformer device (e.g., AP 304). Feature vector generator module 316 may subsequently calculate, or produce at least one feature vector 316a that is based on the extracted angle parameters, and on the at least one CSI data element. For example, in such embodiments, feature vector 316a may include a concatenation of pre-steering matrix V 314a elements (e.g., as elaborated in Eq. 6) and the at least one CSI data element.

Additionally, or alternatively, system 302 may receive transmissions of dataframes 200b of the standard beamforming protocol from more than one beamformee. For example, at a first timing, system 302 may receive or monitor a first transmission of dataframes 200b, sent from a first beamformee, such as a first STA 306, and in a second timing, system 302 may receive or monitor a second transmission of dataframes 200b, sent from a second beamformee, such as a second STA or an AP 304. In such embodiments, RF monitoring module 312 may monitor the first transmission and the second transmission on wireless channel 300. RF monitoring module 312 may extract a first set of angle parameters 200b' from one or more first dataframes of the first transmission, and extract a second set of angle parameters 200b' from one or more second dataframes 200b of the second transmission. Feature vector generator module 316 may collaborate with pre-steering module 314, as elaborated herein to calculate at least one feature vector 316a based on the first set of angle parameters 200b' and second set of angle parameters 200b'. For example, in such embodiments, feature vector 316a may include a concatenation of pre-steering matrix V 314a elements (e.g., as elaborated in Eq. 6), transmitted from the first set of angle parameters 200b' and from the second set of angle parameters 200b'.

Figure 4A:
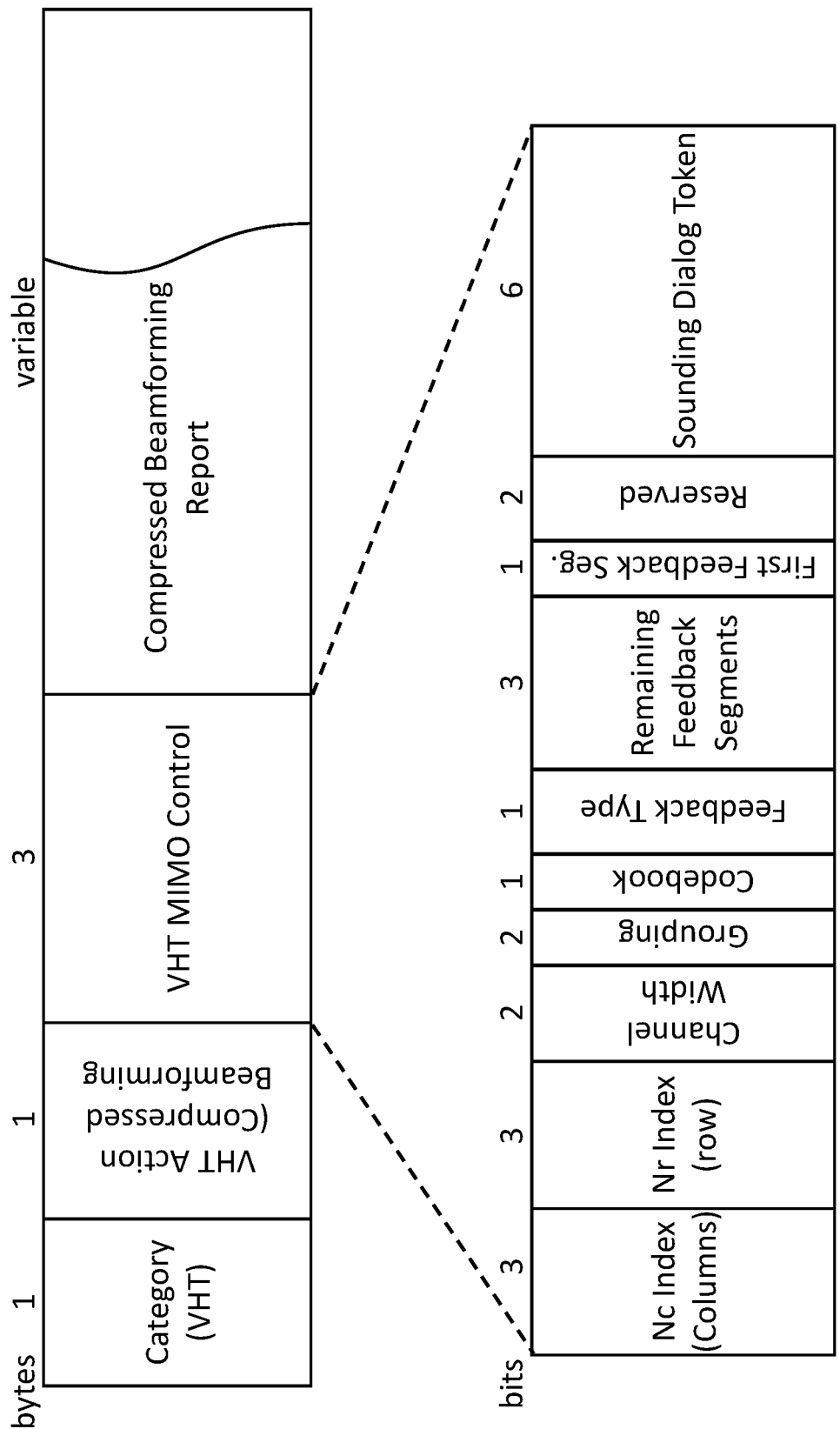
FIGS. 4A and 4B are schematic diagrams, depicting examples of beamforming protocol dataframes or packets, as defined by the 802.11 wireless protocol.
Figure 4B:
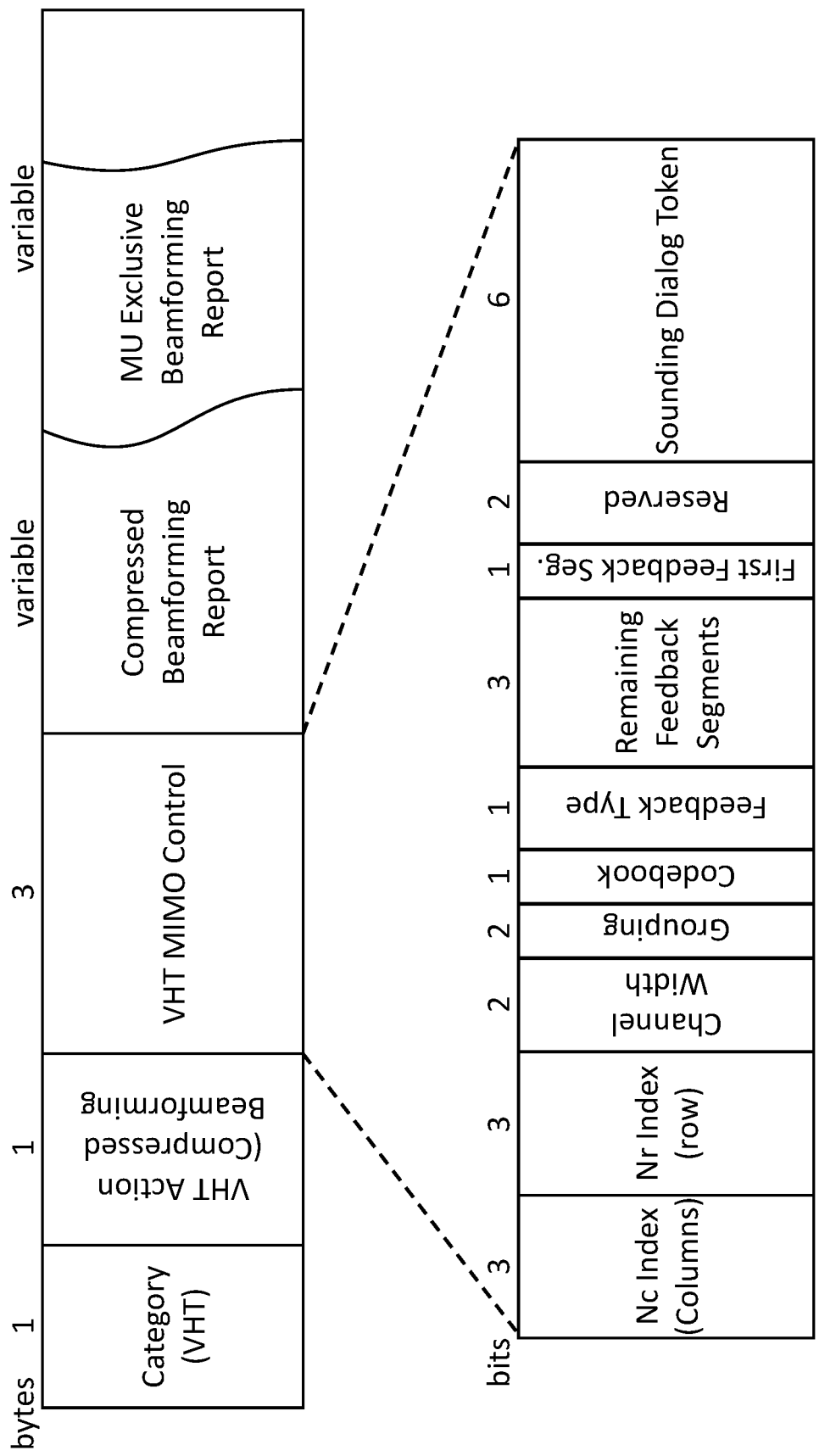

Reference is now made to FIGS. 4A and 4B, which are schematic diagrams, depicting examples of beamforming protocol dataframes or packets 200b, as defined by the 802.11 wireless protocol.

According to some embodiments, the dataframes 200b of the standard beamforming protocol may be, or may include a single user (SU) Compressed beamforming action frame, as defined in the 802.11 wireless communication standard, and as depicted in FIG. 4A. Additionally, or alternatively, the dataframes of the standard beamforming protocol 200b may be, or may include a multiple user (MU) Compressed beamforming action frame, as defined in the 802.11, as defined in the 802.11 wireless communication standard, and as depicted in FIG. 4B.

According to some embodiments, feature vector generator 316 may extract a value of one or more data elements from an "MU exclusive beamforming report" field of the dataframes of the standard beamforming protocol 200b. Feature vector generator 316 may then produce a feature vector 316a that includes the extracted values of the one or more data elements of the "MU exclusive beamforming report" field.

For example, the "MU exclusive beamforming report" field of the dataframes 200b of the standard beamforming protocol may include subcarrier-specific signal to noise ratio (SNR) values. According to some embodiments, feature vector generator 316 may generate, or calculate the at least one feature vector 316a by: (i) extracting one or more subcarrier-specific SNR values from the dataframes 200b of the standard beamforming protocol (e.g., from the "MU exclusive beamforming report" field); and (ii) producing a feature vector 316a that may include the one or more subcarrier-specific SNR values.

Additionally, or alternatively, the at least one feature vector 316a may include data elements from other fields of dataframes 200b of the standard beamforming protocol, as depicted in FIGS. 4A and/or 4B. For example, feature vector generator 316 may extract a value of one or more data elements from a "Very High Throughput (VHT) Multiple-input-multiple-output (MIMO) control" field of the dataframes of the standard beamforming protocol, and subsequently produce a feature vector 316a that may include the value of the one or more extracted values of data elements of the "VHT MIMO control" field.

According to some embodiments, the at least one feature vector 316a may include a concatenation of various types of data elements, as elaborated herein. For example, the at least one feature vector 316a may include one or more data elements selected from: (i) pre-steering matrix V 314a values (e.g., as elaborated in Eq. 6), (ii) CSI data elements, (iii) subcarrier-specific SNR values (e.g., from the "MU exclusive beamforming report" field), and/or values of data elements of the "VHT MIMO control" field.

Referring back to FIG. 3B, system 302 may include a machine-learning (ML) module 318. In some embodiments, machine learning module 318 may be configured to train and inference one or more machine learning models configured to predict whether a received data transmission was transmitted from one or more specific wireless devices, based, at least in part, on features extracted from and/or representing dataframes (such as dataframe 200b shown in FIG. 2) of the standard beamforming protocol transmitted by the specific device.

In some embodiments, machine learning module 318 may be configured to train one or more machine learning models on corresponding training datasets, each comprising a plurality of dataframes (such as dataframe 200b shown in FIG. 2) of the standard beamforming protocol, transmitted from one or more specific wireless devices (such as one of STAs 306a-306c), as well as one or more additional wireless devices, wherein each of the dataframes is annotated with a label indicated at least the identity of the wireless device from which is was transmitted. In some embodiments, at least some of the dataframes may be also annotated with at least one of: (i) device temperature at the time of transmission, (ii) receiving device (e.g., AP 304) temperature at the time of receiving, and (iii) signal-to-noise ratio (SNR) of the transmitted signal associated with the feature vector.

In some embodiments, machine learning module 318 may be configured to train one or more machine learning models on corresponding training datasets, each comprising a plurality of feature vectors (such as feature vector 316a) extracted as detailed herein above from a plurality of dataframes (such as dataframe 200b shown in FIG. 2) of the standard beamforming protocol, wherein the dataframes transmitted from a known wireless device as well as one or more additional wireless devices, and wherein each of the feature vectors is annotated with a label indicated the identity of the wireless device associated therewith. In some embodiments, at least some of the feature vectors may be also annotated with at least one of: (i) device temperature at the time of transmission, (ii) receiving device (e.g., AP 304) temperature at the time of receiving, and (iii) signal-to-noise ratio (SNR) of the transmitted signal associated with the feature vector.

In some embodiments, following the training stage, a trained machine learning model of the present technique may be configured to predict whether a received data transmission was transmitted from the specific wireless device. In some embodiments, the present technique may provide for using such prediction as part of fingerprinting authentication of the specific RF device.

In some embodiments, the instructions of ML module 318 may cause system 302 to receive training data, process it, and output one or more training datasets, each comprising a plurality of annotated data samples, based on one or more annotation schemes. The instructions of ML module 318 may further cause system 302 to train and implement one or more machine learning models using the one or more training datasets constructed by ML module 318. In some embodiments, ML module 318 may implement one or more machine learning models using various model architectures, e.g., convolutional neural network (CNN), recurrent neural network (RNN), or deep neural network (DNN), adversarial neural network (ANN), and/or any other suitable machine learning model architecture. The terms 'machine learning model' and 'machine learning classifier' are used interchangeably, and may be abbreviated 'model' or 'classifier.' These terms are intended to refer to any type of machine learning model which is capable of producing an output, e.g., a classification, a prediction, or generation of new data, based on a training scheme which trains a model to perform a specified prediction or classification. Classification algorithms can include linear discriminant analysis, classification and regression trees/decision tree learning/random forest modeling, nearest neighbor, support vector machine, logistic regression, generalized linear models, Naive Bayesian classification, and neural networks, among others According to some embodiments, ML model 318 may receive, e.g., from feature vector generator 316, at least one feature vector 316a, pertaining to a specific beamformee (e.g., STA 306). ML model 318 may be trained to produce an RF fingerprint 322a, pertaining to, or corresponding to the specific beamformee (e.g., STA 306), based on the at least one feature vector 316a, as elaborated herein. Additionally, or alternatively, ML model 318 may be trained to identify specific beamformee (e.g., STA 306), based on the at least one feature vector 316a. The term "identify" may be used in this context in a sense that system 302 may produce a unique identification data computing device 100 that may be for example a name string, an identification number, and the like, and may uniquely identify or discern a specific beamformee (e.g., STA 306) from a plurality of beamformee devices.

According to some embodiments, during an inference stage, system 302 may introduce, or input at least one feature vector 316a, corresponding to at least one specific beamformee (e.g., STA 306, AP 304) to ML based model 318. System 302 may consequently obtain from ML model 318 an RF fingerprint 322a corresponding to the at least one specific beamformee. Additionally, or alternatively, system 302 may obtain from ML model 318 a channel-invariant prediction of an identification 322b of the at least one beamformee (e.g., STA 306, AP 304). Identification 322b may be referred to as "channel-invariant" in a sense that identification 322b may uniquely correspond to, or represent a respective beamformee, and may not be affected, for example, by: (i) properties of location, such as relative distance and/or direction of a beamformee in relation to a beamformer; (ii) properties of a medium of wireless channel 300, such as RF reflections from intervening objects (e.g., multipaths), temperature, humidity, etc.; and (iii) properties of motion, such as speed, fading, doppler effect, etc.

According to some embodiments, ML module 318 may be, or may include one or more NN layers, including a plurality of NN nodes, adapted to produce at least one feature vector, that is a channel-invariant fingerprint 322a, of at least one beamformee (e.g., corresponding a beamforming dataframe 200b transmitted from a specific beamformee such as an STA 306 or AP 304).

In other words, fingerprint 322a may be, for example, a feature vector that includes a plurality of data elements, where each data element is an output of a neural node of ML model 318.

According to some embodiments, ML module 318 may be adapted to predict the identification 322b of at least one beamformee (e.g., STA 306) based on the channel-invariant fingerprint 322a. Reference is made to the above example, where fingerprint 322a is a feature vector that includes a plurality of output values of neural nodes of ML module 318. In this example, ML module 318 may receive the fingerprint 322a feature vector from ML module 318. ML module 318 may include, for example, at least one layer of neural nodes, that may be trained to classify (or predict, as commonly referred to in the art), an identification 322b of a beamformee (e.g., STA 306), corresponding to a specific beamforming dataframe 200b.

According to some embodiments, during a training stage, ML model 318 may be trained to identify at least one beamformee (e.g., STA 306) via a supervised training scheme. For example, feature vector generator module 316 may receive (e.g., from input devices 112 of FIG. 1) one or more annotated feature vectors 316a. The term "annotated" may be used in this context to indicate a feature vector 316a that may be annotated, or labeled as being associated with, or representing an identification of a specific beamformee device (e.g., a specific STA 306, a specific AP 304). The annotated feature vectors 316a may be introduced as input to ML model 318 as supervisory data, and system 302 may thus train ML model 318 to identify at least one beamformee (e.g., STA 306, AP 304) device, and produce a device identification 322b, based on the annotated feature vectors 316a.

According to some embodiments, ML model 318 may be trained so that the fingerprint 322a feature vector, and/or the device identification 322b may be channel-invariant.

For example, ML model 318 may be trained based on a plurality of annotated feature vectors 316a as supervisory data, each transmitted from, or calculated from a beamforming dataframe 200*b* that was obtained from a different position of the beamformee and/or beamformer. In other words, ML model 318 may receive a first annotated feature vector 316*a*, corresponding to a first position of at least one beamformee device (e.g., STA 306), in relation to at least one beamformer device (e.g., AP 304), and a second annotated feature vector 316*a*, corresponding to a second, different position of the at least one beamformee device (e.g., STA 306), in relation to the beamformer device (e.g., AP 304). In this context, the term "position" may refer, for example, to a distance between the beamformee device (e.g., STA 306) and beamformer device (e.g., AP 304), a direction of beamformee device (e.g., STA 306) in relation to beamformer device (e.g., AP 304), existence (or lack thereof) of intervening objects between or in vicinity to the beamformee and beamformer devices (e.g., STA 306 and AP 304), and the like.

It may be appreciated by a person skilled in the art that such variety of position of the beamformer and beamformee as part of the training of ML model 318 may produce a trained model 318 that is oblivious to changes in angle parameters 200*b*' that are induced by changes in position (e.g., relative positioning of STA 306 and AP 304). Subsequently, the produced fingerprint 322*a* and/or device identification 322*b* may be channel-invariant, in a sense that identification of a specific wireless device may not be affected by changes in position.

Additionally, or alternatively, ML model 318 may be trained based on a plurality of annotated feature vectors 316*a* as supervisory data, each transmitted from, or calculated from a beamforming dataframe 200*b* that was obtained in different channel conditions.

In other words, ML model 318 may receive a first annotated feature vector 316*a*, corresponding to a first set of channel condition values, and a second annotated feature vector 316*a*, corresponding to a second set of channel condition values. Such channel condition values may include values representing a fading effect of wireless channel 300, a doppler effect of wireless channel 300, existence of reflections or multipaths in wireless channel 300, and the like. Such variety of channel condition values may be obtained, for example, by movement of one wireless communication device (e.g., the beamformee) in relation to another wireless communication device (e.g., the beamformer).

It may be appreciated by a person skilled in the art that such variety of channel condition values as part of the training of ML model 318 may produce a trained model 318 that is oblivious to changes in angle parameters 200*b*' that are induced by changes in channel condition values. Subsequently, the produced fingerprint 322*a* and/or device identification 322*b* may be channel-invariant, in a sense that identification of a specific wireless device may not be affected by changes in channel condition values.

Figure 5:
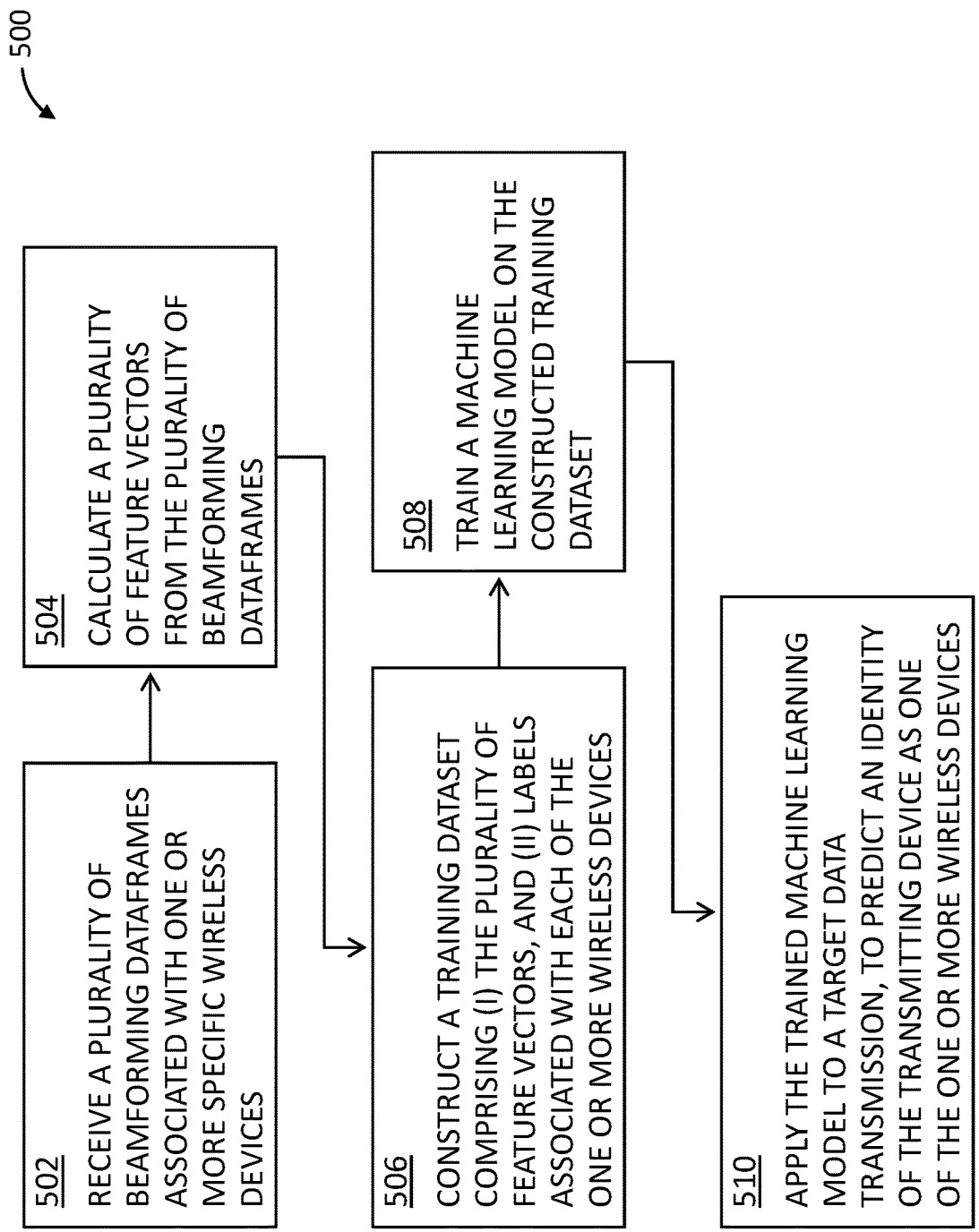
FIG. 5 is a flow diagram which illustrates the functional steps in a method for training one or more machine learning models to predict whether a received data transmission was transmitted from one or more specific wireless device, based, at least in part, on features extracted from and/or representing dataframes of the standard beamforming protocol transmitted by the specific device, according to some embodiments of the invention.

The instructions of Machine learning module 318 are now discussed with reference to the flowchart of FIG. 5, which illustrates the functional steps in a method 500 for training one or more machine learning models of the present technique, configured to predict whether a received data transmission was transmitted from one or more specific wireless device, based, at least in part, on features extracted from and/or representing dataframes of the standard beamforming protocol transmitted by the specific device.

The various steps of method 500 will be described with continuous reference to exemplary system 302 shown in FIG. 3A, and to FIGS. 2 and 3B. The various steps of method 500 may either be performed in the order they are presented or in a different order (or even in parallel), as long as the order allows for a necessary input to a certain step to be obtained from an output of an earlier step. In addition, the steps of method 500 may be performed automatically (e.g., by system 302 of FIG. 3A), unless specifically stated otherwise. In addition, the steps of FIG. 5 are set forth for exemplary purposes, and it is expected that modification to the flow chart is normally required to accommodate various network configurations and network carrier business policies.

Method 500 begins in step 502, where the instructions of RF monitoring module 312 may cause system 302 to monitor transmissions over a wireless channel between a beamformer (e.g., a wireless access point (AP)) and at least one beamformee (e.g., one or more of STAs 306*a*-306*c*). For example, the monitored transmissions may include beamforming dataframes (e.g., dataframes 200*b* of FIG. 3B) of a standard beamforming protocol, such as single user (SU) or multiple user (MU) compressed beamforming action frames, as defined in the 802.11, and as elaborated herein (e.g., in relation to FIG. 4A-4B).

Accordingly, in some embodiments, the instructions of RF monitoring module 312 may cause system 302 to receive, as input, a plurality of beamforming dataframes (such as 200*b* shown in FIG. 2) transmitted between one or more specific wireless device/beamformee (such as one or more of STAs 306*a*-306*c*) and at beamformer (e.g., AP 304).

In some embodiments, the instructions of RF monitoring module 312 may cause system 302 to receive, as input, an additional plurality of beamforming dataframes transmitted from between a plurality of additional and/or other beamformees and beamformers. For example, the additional plurality of beamforming dataframes may be received from a stored cache of beamforming dataframes on a storage device accessible to system 302 (such as storage system 110 shown in FIG. 1).

In some embodiments, the received plurality of beamforming dataframes may represent data transmissions from the one or more beamformee devices over various operational conditions and parameters, including, but not limited to:

Varying beamformee device temperature(s), as may be measured by multiple device sensors;
varying beamformer device temperature(s);
varying ambient conditions such as temperature, relative humidity, etc.;
varying subcarriers of the wireless channel;
specific antenna of the beamformee device;
specific antenna of the beamformer device;
varying distances, positions and orientations of the beamformee device relative to the beamformer device;
alternating connectivity states (i.e., on/off) of various wireless communication elements within the beamformee device, including Wi-Fi, cellular band, Bluetooth, and/or other wireless functions within the beamformee/beamformer devices;
varying signal-to-noise (SNR) values measured at the beamformer associated with the data transmissions;
a fading effect of the wireless channel;
a doppler effect of the wireless channel; and/or
existence of reflections or multipaths in the wireless channel.

In some embodiments, the instructions of RF monitoring module 312 may cause system 302 to monitor the one or more operational conditions and parameters associated with at least some of the beamforming dataframes, and to store the association, e.g., on a storage device accessible to system 302 (such as storage system 110 shown in FIG. 1).

In some embodiments, in optional step 504, the instructions of feature vector module 316 may cause system 302 to calculate and store a plurality of feature vectors 316a associated with the dataframes of the standard beamforming protocol received in step 502, according to the technique elaborated hereinabove (e.g., in relation to FIG. 4A, and/or FIG. 4B).

In some embodiments, in step 506, the instructions of ML module 318 may cause system 302 to construct one or more training datasets, each configured to train a machine learning model of the present technique, to predict whether a received data transmission was transmitted from one or more specific wireless devices.

In some embodiments, the instructions of ML module 318 may cause system 302 to construct a first exemplary training dataset configured to train a device-specific machine learning model of the present technique, to predict whether a received data transmission was transmitted from the specific wireless device. In some embodiments, such exemplary training dataset may comprise:
  (i) A plurality of beamforming dataframes (such as 200b shown in FIG. 2) transmitted from a specific wireless device/beamformee (such as STA 306a), as received in step 502, and an additional plurality of beamforming dataframes transmitted from a plurality of other wireless devices. Optionally, the training dataset may also include a plurality of feature vectors 316a as calculated in step 504, associated with at least some of the plurality of beamforming dataframes; and
  (ii) labels indicating whether each of the beamforming dataframes was transmitted from (or feature vector associated with) the specific device. In some embodiments, the labels may be binary, e.g., yes/no, [I/O], etc.

In some embodiments, each of the plurality of beamforming dataframes (or feature vectors) may be labeled with its respective label.

In some embodiments, the training dataset may include additional annotations, indicating at least one of the following operational conditions and parameters associated with each of the beamforming dataframes:
  Wireless device/beamformee operational temperature(s);
  beamformer device temperature(s);
  signal-to-noise (SNR) value as measured at the beamformer associated with the dataframe;
  a fading effect of the wireless channel;
  a doppler effect of the wireless channel; and/or
  existence of reflections or multipaths in the wireless channel.

In some embodiments, the training dataset may include additional and/or other annotations indicating at least one of the following operational conditions and parameters associated with each of the beamforming dataframes:
  subcarrier of the wireless channel;
  specific antenna of the wireless device/beamformee;
  specific antenna of the beamformer device;
  distances and orientation of the beamformee device relative to the beamformer device;
  a connectivity states (i.e., on/off) of various wireless communication elements within the beamformee device, including Wi-Fi, cellular band, Bluetooth, and/or other wireless functions within the beamformee/beamformer devices;
  a fading effect of the wireless channel;
  a doppler effect of the wireless channel; and/or
  existence of reflections or multipaths in the wireless channel.

In some embodiments, the instructions of ML module 318 may cause system 302 to construct a second exemplary training dataset configured to train a device-specific machine learning model of the present technique to predict whether a received data transmission was transmitted from the specific wireless device.

In some embodiments, such exemplary training dataset may comprise:
  (i) A plurality of feature vectors 316a calculated in step 504, associated with the dataframes of the standard beamforming protocol received in step 502 from the specific wireless device/beamformee (such as STA 306a), and an additional plurality of feature vectors associated with beamforming dataframes transmitted from a plurality of other wireless devices; and
  (ii) labels indicating whether each of the feature vectors is associated with the specific device. In some embodiments, the labels may be binary, e.g., yes/no, [1/0], etc.

In some embodiments, each of the plurality of feature vectors may be labeled with its respective label.

In some embodiments, the training dataset may include additional annotations, indicating at least one of the following operational conditions and parameters associated with each of the beamforming dataframes:
  Wireless device/beamformee operational temperature(s);
  beamformer device temperature(s);
  signal-to-noise (SNR) value as measured at the beamformer associated with the dataframe.

In some embodiments, the training dataset may include additional and/or other annotations indicating at least one of the following operational conditions and parameters associated with each of the beamforming dataframes:
  subcarrier of the wireless channel;
  specific antenna of the wireless device/beamformee;
  specific antenna of the beamformer device;
  distances and orientation of the beamformee device relative to the beamformer device;
  a connectivity states (i.e., on/off) of various wireless communication elements within the beamformee device, including Wi-Fi, cellular band, Bluetooth, and/or other wireless functions within the beamformee/beamformer devices;
  a fading effect of the wireless channel;
  a doppler effect of the wireless channel; and/or
  existence of reflections or multipaths in the wireless channel.

In some embodiments, the instructions of ML module 318 may cause system 302 to construct a third exemplary training dataset configured to train a multi-class machine learning model of the present technique to predict whether a received data transmission was transmitted from one of a set of specific wireless devices, for example, two or more STAs within a home network (such as STAs 306a-306c).

In some embodiments, such exemplary training dataset may comprise:
  (i) A plurality of beamforming dataframes (such as 200b shown in FIG. 2) transmitted from the set of specific wireless devices/beamformees (such as STAs 306a-306c), as received in step 502, and, optionally, an additional plurality of beamforming dataframes transmitted from a plurality of other wireless devices. Optionally, the training dataset may also include a plurality of feature vectors 316a as calculated in step 504, associated with at least some of the plurality of beamforming dataframes; and (ii) labels indicating the identity of the beamformee device from which each of the beamforming dataframes transmitted (or the identity of the beamformee device each of the feature vectors is associated with). For example, the labels may include multi-class labels indicating an association with a specific one of the set of specific wireless devices/beamformees (such as STAs 306a-306c). Optionally, an additional class label may indicate whether a beamforming dataframe was transmitted from another wireless device not included in the set of specific wireless devices/beamformees.

In some embodiments, each of the plurality of feature vectors beamforming dataframes (or feature vectors) may be labeled with its respective label.

In some embodiments, the training dataset may include additional annotations, indicating at least one of the following operational conditions and parameters associated with each of the beamforming dataframes:
Wireless device/beamformee operational temperature(s);
beamformer device temperature(s);
signal-to-noise (SNR) value as measured at the beamformer associated with the dataframe.

In some embodiments, the training dataset may include additional and/or other annotations indicating at least one of the following operational conditions and parameters associated with each of the beamforming dataframes:
subcarrier of the wireless channel;
specific antenna of the wireless device/beamformee;
specific antenna of the beamformer device;
distances and orientation of the beamformee device relative to the beamformer device; and/or
a connectivity states (i.e., on/off) of various wireless communication elements within the beamformee device, including Wi-Fi, cellular band, Bluetooth, and/or other wireless functions within the beamformee/beamformer devices.

In some embodiments, the instructions of ML module 318 may cause system 302 to construct a fourth exemplary training dataset configured to train a multi-class machine learning model of the present technique to predict whether a received data transmission was transmitted from a set of specific wireless devices, e.g., two or more STAs within a home network (such as STAs 306a-306c).

In some embodiments, such exemplary training dataset may comprise:
(i) A plurality of feature vectors 316a calculated in step 504, associated with the dataframes of the standard beamforming protocol received in step 502 from the set of specific wireless devices/beamformees (such as STAs 306a-306c), and, optionally, an additional plurality of feature vectors associated with beamforming dataframes transmitted from a plurality of other wireless devices; and
(ii) labels indicating the identity of the beamformee device associated with each of the feature vectors. For example, the labels may include multi-class labels indicating an association with a specific one of the set of specific wireless devices/beamformees (such as STAs 306a-306c). Optionally, an additional class label may indicate whether a feature vector is associated with another wireless device not included in the set of specific wireless devices/beamformees.

In some embodiments, each of the plurality of feature vectors may be labeled with its respective label.

In some embodiments, the training dataset may include additional annotations, indicating at least one of the following operational conditions and parameters associated with each of the beamforming dataframes:
Wireless device/beamformee operational temperature(s);
beamformer device temperature(s);
signal-to-noise (SNR) value as measured at the beamformer associated with the dataframe.

In some embodiments, the training dataset may include additional and/or other annotations indicating at least one of the following operational conditions and parameters associated with each of the beamforming dataframes:
subcarrier of the wireless channel;
specific antenna of the wireless device/beamformee;
specific antenna of the beamformer device;
distances and orientation of the beamformee device relative to the beamformer device;
a connectivity states (i.e., on/off) of various wireless communication elements within the beamformee device, including Wi-Fi, cellular band, Bluetooth, and/or other wireless functions within the beamformee/beamformer devices;
a fading effect of the wireless channel;
a doppler effect of the wireless channel; and/or
existence of reflections or multipaths in the wireless channel.

In some embodiments, in step 508, the instructions of ML module 318 may cause system 302 to train one or more machine learning models, each on one of the exemplary training datasets constructed in step 506.

In some embodiments, in step 510, following the learning stage, at an inference stage, the instructions of ML module 318 may cause system 302 to apply a trained machine learning model of the present technique to a target data transmission, to predict whether the target data transmission was transmitted from a specific wireless device. for example:
The instructions of ML module 318 may cause system 302 to apply the first exemplary device-specific machine learning model of the present technique to a received target data transmission, to predict whether the received target data transmission was transmitted from the specific wireless device.
The instructions of ML module 318 may cause system 302 to apply the second exemplary device-specific machine learning model of the present technique to a target feature vector associated with a received data transmission, to predict whether the received target data transmission was transmitted from the specific wireless device
The instructions of ML module 318 may cause system 302 to apply the third exemplary multi-class machine learning model of the present technique to a received target data transmission, to predict which of a set of specific wireless devices (such as STAs 306a-306c) transmitted the received target data transmission.
The instructions of ML module 318 may cause system 302 to apply the fourth exemplary multi-class machine learning model of the present technique to a target feature vector associated with a received data transmission, to predict which of a set of specific wireless devices (such as STAs 306a-306c) transmitted the received target data transmission.

Figure 6:
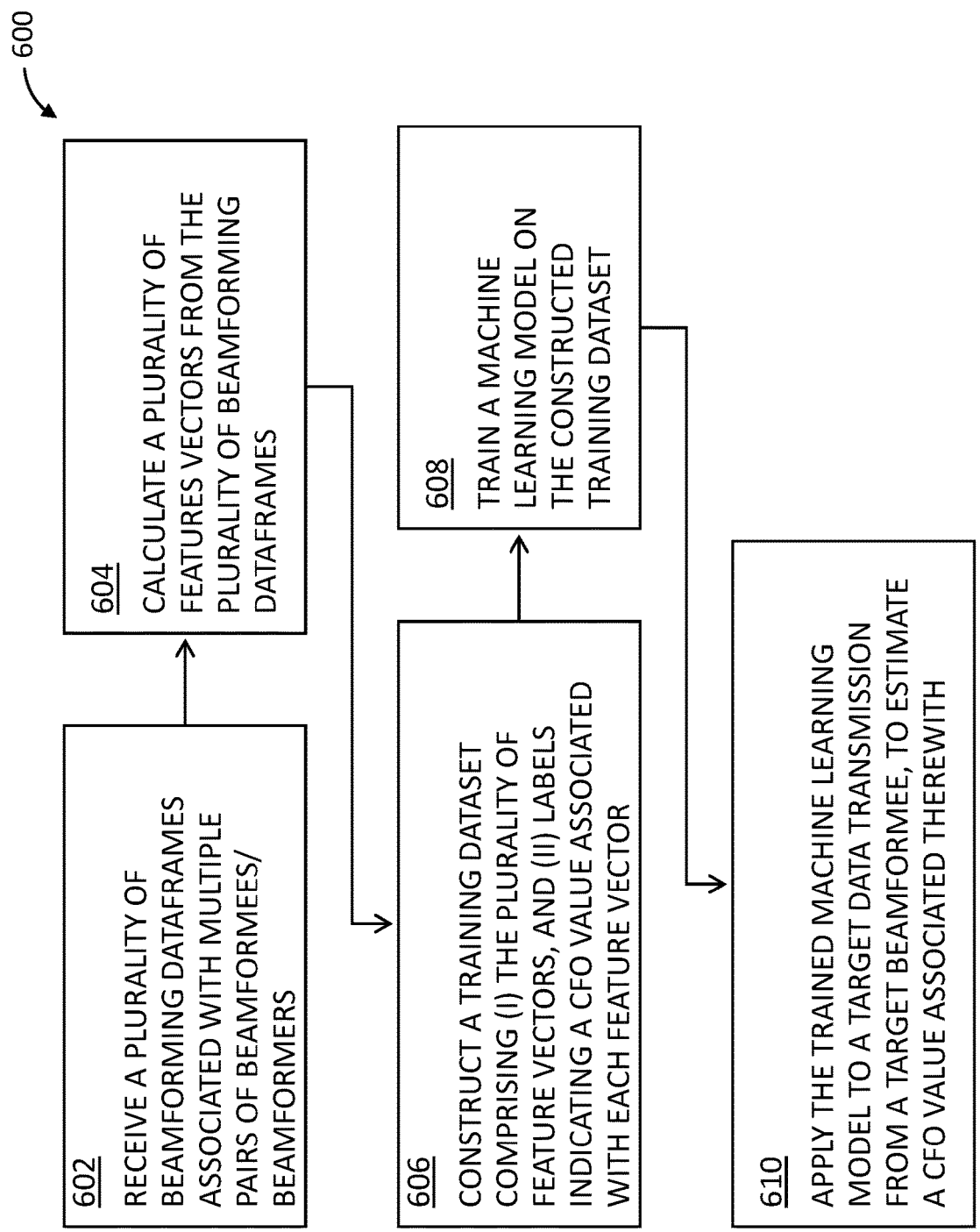
FIG. 6 is a flow diagram which illustrates the functional steps in a method for training one or more machine learning models of the present technique, configured to estimate a CFO value of a target beamformee, based, at least in part, on features extracted from and/or representing dataframes of the standard beamforming protocol transmitted by a plurality of pairs of beamformees/beamformers, according to some embodiments of the invention.

The instructions of Machine learning module 318 are now further discussed with reference to the flowchart of FIG. 6, which illustrates the functional steps in a method 600 for training one or more machine learning models of the present technique, configured to estimate a CFO value of a target beamformee, based, at least in part, on features extracted from and/or representing dataframes of the standard beamforming protocol transmitted by a plurality of pairs of beamformees/beamformers.

The various steps of method 600 will be described with continuous reference to exemplary system 302 shown in FIG. 3A, and to FIGS. 2 and 3B. The various steps of method 600 may either be performed in the order they are presented or in a different order (or even in parallel), as long as the order allows for a necessary input to a certain step to be obtained from an output of an earlier step. In addition, the steps of method 600 may be performed automatically (e.g., by system 302 of FIG. 3A), unless specifically stated otherwise. In addition, the steps of FIG. 6 are set forth for exemplary purposes, and it is expected that modification to the flow chart is normally required to accommodate various network configurations and network carrier business policies.

Method 600 begins in step 602, where the instructions of RF monitoring module 312 may cause system 302 to monitor transmissions over a wireless channel between pairs of beamformee/beamformers among a plurality of beamformees and beamformers. The plurality of beamformees may include a diverse plurality of wireless devices (such as smartphones, tablets, smart watches, etc.) of various makes and models. The plurality of beamformers may include devices such as wireless routers, wireless switches, base stations, and the like, of various makes and models.

For example, the monitored transmissions may include beamforming dataframes (e.g., dataframes 200b of FIG. 3B) of a standard beamforming protocol, such as single user (SU) or multiple user (MU) compressed beamforming action frames, as defined in the 802.11, and as elaborated herein (e.g., in relation to FIG. 4A-4B).

Accordingly, in some embodiments, the instructions of RF monitoring module 312 may cause system 302 to receive, as input, a plurality of beamforming dataframes (such as 200b shown in FIG. 2) transmitted between specific combinations of pairs of beamformee/beamformers selected from among a given plurality of beamformees and beamformers.

In some embodiments, the plurality of beamforming dataframes may be received from a stored cache of beamforming dataframes on a storage device accessible to system 302 (such as storage system 110 shown in FIG. 1).

In some embodiments, the received plurality of beamforming dataframes may represent data transmissions from the beamformee devices over various operational conditions and parameters, including, but not limited to:

Varying beamformee device temperature(s), as may be measured by multiple device sensors;
varying beamformer device temperature(s);
varying ambient conditions such as temperature, relative humidity, etc.;
varying subcarriers of the wireless channel;
specific antenna of the beamformee device;
specific antenna of the beamformer device;
varying distances, positions and orientations of the beamformee device relative to the beamformer device;
alternating connectivity states (i.e., on/off) of various wireless communication elements within the beamformee device, including Wi-Fi, cellular band, Bluetooth, and/or other wireless functions within the beamformee/beamformer devices;
varying signal-to-noise (SNR) values measured at the beamformer associated with the data transmissions;
a fading effect of the wireless channel;
a doppler effect of the wireless channel; and/or
existence of reflections or multipaths in the wireless channel.

In some embodiments, the instructions of RF monitoring module 312 may cause system 302 to monitor the one or more operational conditions and parameters associated with at least some of the beamforming dataframes, and to store the association, e.g., on a storage device accessible to system 302 (such as storage system 110 shown in FIG. 1).

In some embodiments, in optional step 604, the instructions of feature vector module 316 may cause system 302 to calculate and store a plurality of feature vectors 316a associated with the dataframes of the standard beamforming protocol received in step 602, according to the technique elaborated hereinabove (e.g., in relation to FIG. 4A, and/or FIG. 4B).

In some embodiments, in step 606, the instructions of ML module 318 may cause system 302 to construct a training dataset configured to train a machine learning model of the present technique, to estimate a CFO value of a specific wireless device, based, at least in part, on features extracted from and/or representing dataframes of the standard beamforming protocol transmitted by the specific device, according to some embodiments of the invention.

In some embodiments, the instructions of ML module 318 may cause system 302 to construct a first exemplary training dataset comprising:
 (i) A plurality of beamforming dataframes (such as 200b shown in FIG. 2) transmitted between pairs of beamformee/beamformers among a plurality of beamformees and beamformers, as received in step 602; and
 (ii) labels indicating a CFO value associated with each of the beamforming dataframes.

In some embodiments, the instructions of ML module 318 may cause system 302 to construct a second exemplary training dataset comprising:
 (i) A plurality of feature vectors 316a calculated in step 604, associated with the dataframes of the standard beamforming protocol received in step 602, and
 (ii) labels indicating a CFO value associated with each of the feature vectors.

In some embodiments, each of the plurality of beamforming dataframes may be labeled with its respective label.

In some embodiments, the instructions of ML module 318 may cause system 302 to construct one or more additional exemplary training datasets, comprising, for example, various combinations of the features included in the first and second exemplary training datasets described above.

In some embodiments, each of the exemplary training datasets described above may include additional annotations, indicating at least one of the following operational conditions and parameters associated with each of the beamforming dataframes:

Wireless device/beamformee operational temperature(s);
beamformer device temperature(s);
signal-to-noise (SNR) value as measured at the beamformer associated with the dataframe;
a fading effect of the wireless channel;
a doppler effect of the wireless channel; and/or
existence of reflections or multipaths in the wireless channel.

In some embodiments, each of the exemplary training datasets described above may include additional and/or other annotations indicating at least one of the following operational conditions and parameters associated with each of the beamforming dataframes:

subcarrier of the wireless channel;
specific antenna of the wireless device/beamformee;
specific antenna of the beamformer device;
distances and orientation of the beamformee device relative to the beamformer device;
a connectivity states (i.e., on/off) of various wireless communication elements within the beamformee device, including Wi-Fi, cellular band, Bluetooth, and/or other wireless functions within the beamformee/beamformer devices;
a fading effect of the wireless channel;
a doppler effect of the wireless channel; and/or
existence of reflections or multipaths in the wireless channel.

In some embodiments, in step 608, the instructions of ML module 318 may cause system 302 to train a machine learning model on one of the exemplary training datasets constructed in step 606.

In some embodiments, in step 610, following the learning stage, at an inference stage, the instructions of ML module 318 may cause system 302 to apply a trained machine learning model of the present technique to a target data transmission, to predict a CFO value associated with the beamformee device which transmitted the target data transmission.

In some embodiments, the instructions of ML module 318 may cause system 302 to apply the trained machine learning model of the present technique to a target feature vector associated with a received data transmission, to predict a CFO value associated with the beamformee device which transmitted the target data transmission.

Embodiments of the invention may include a practical application for performing device fingerprinting and/or identification. For example, embodiments of the invention may utilize transmission of standard wireless beamforming protocols, to uniquely identify one or more specific wireless devices in a wireless communication network.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

The present invention may be a computer system, a computer-implemented method, and/or a computer program product. The computer program product may include a computer readable storage medium (or media) having computer readable program instructions thereon for causing a hardware processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, a field-programmable gate array (FPGA), or a programmable logic array (PLA) may execute the computer readable program instructions by utilizing state information of the computer readable program instructions to personalize the electronic circuitry, in order to perform aspects of the present invention. In some embodiments, electronic circuitry including, for example, an application-specific integrated circuit (ASIC), may be incorporate the computer readable program instructions already at time of fabrication, such that the ASIC is configured to execute these instructions without programming.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a hardware processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A system comprising:
   at least one hardware processor; and
   a non-transitory computer-readable storage medium having stored thereon program instructions, the program instructions executable by the at least one hardware processor to:
   monitor wireless data transmissions representing a beamforming process of a wireless communication protocol between at least one wireless access point (AP) and a plurality of wireless stations (STAs), to obtain a plurality of beamforming dataframes transmitted by said STAs, calculate, from said plurality of dataframes, a plurality of feature vectors representing said plurality of dataframes, at a training stage, train a machine learning model on a training dataset comprising:
  (i) said plurality of feature vectors, and
  (ii) labels indicating associations between said plurality of feature vectors dataframes and said STAs, and at an inference stage, apply said trained machine learning model to a target wireless data transmission representing a beamforming process of a wireless communication protocol, to predict whether said target wireless data transmission was transmitted from one of said STAs.

2. The system of claim 1, wherein each of said feature vectors is calculated from said dataframes by:
  extracting angle parameters from said dataframes;
  (ii) calculating at least one pre-steering matrix, based on the extracted angle parameters; and
  (iii) producing, from the at least one pre-steering matrix, said feature vector.

3. The system of claim 2, wherein said calculating further comprises:
  obtaining, from a memory device associated with said at least one AP, at least one data element pertaining to Channel Status Information (CSI) associated with said dataframes; and
  (ii) calculating said feature vector based on the angle parameters and the at least one CSI data element.

4. The system of claim 1, wherein said labels are binary and indicate whether or not each of said dataframes and/or feature vectors is associated with a specific one of said plurality of said STAs.

5. The system of claim 1, wherein said labels are multi-class and indicate an association between each of said dataframes and/or feature vectors and one of a subset of said STAs.

6. The system of claim 1, wherein said labels further include, with respect to each of said dataframes and/or feature vectors, indication of one of the following operational parameters: STA operating temperature, AP operating temperature, and signal-to-noise (SNR) ratio value of a signal associated with said dataframe and/or feature vector.

7. A computer-implemented method comprising:
  monitoring wireless data transmissions representing a beamforming process of a wireless communication protocol between at least one wireless access point (AP) and a plurality of wireless stations (STAs) to obtain a plurality of beamforming dataframes transmitted by said STAs;
  calculating, from said plurality of dataframes, a plurality of feature vectors representing said plurality of dataframes;
  at a training stage, training a machine learning model on a training dataset comprising:
    said plurality of feature vectors, and
    (ii) labels indicating associations between said plurality of feature vectors and said STAs; and
  at an inference stage, applying said trained machine learning model to a target wireless data transmission representing estimation of a wireless channel, to predict whether said target wireless data transmission was transmitted from one of said STAs.

8. The computer-implemented method of claim 7, wherein each of said feature vectors is calculated from said dataframes by:
  (i) extracting angle parameters from said dataframes;
  (ii) calculating at least one pre-steering matrix, based on the extracted angle parameters; and
  (iii) producing, from the at least one pre-steering matrix, said feature vector.

9. The computer-implemented method of claim 8, wherein said calculating further comprises:
  obtaining, from a memory device associated with said at least one AP, at least one data element pertaining to Channel Status Information (CSI) associated with said dataframes; and
  (ii) calculating said feature vector based on the angle parameters and the at least one CSI data element.

10. The computer-implemented method of claim 7, wherein said labels are binary and indicate whether or not each of said dataframes and/or feature vectors is associated with a specific one of said plurality of said STAs.

11. The computer-implemented method of claim 7, wherein said labels are multi-class and indicate an association between each of said dataframes and/or feature vectors and one of a subset of said STAs.

12. The computer-implemented method of claim 7, wherein said labels further include, with respect to each of said dataframes and/or feature vectors, indication of one of the following operational parameters: STA operating temperature, AP operating temperature, and signal-to-noise (SNR) ratio value of a signal associated with said dataframe and/or feature vector.

13. A computer-implemented method comprising:
  monitoring wireless data transmissions representing a beamforming process of a wireless communication protocol between multiple pairings selected from among a plurality of wireless access points (APs) and a plurality of wireless stations (STAs) to obtain a plurality of beamforming dataframes transmitted by said STAs;
  calculating, from said plurality of dataframes, a plurality of feature vectors representing said plurality of dataframes;
  at a training stage, training a machine learning model on a training dataset comprising:
    said plurality of feature vectors, and
    (ii) labels indicating a CFO value associated with each of said monitored transmissions; and
  at an inference stage, applying said trained machine learning model to a target wireless data transmission representing a beamforming process of a wireless communication protocol between a target STA and AP, to predict a CFO value associated with said target wireless data transmission.

14. The computer-implemented method of claim 13, wherein each of said feature vectors is calculated from said dataframes by:
  extracting angle parameters from said dataframes;
  (ii) calculating at least one pre-steering matrix, based on the extracted angle parameters; and
  (iii) producing, from the at least one pre-steering matrix, said feature vector.

15. The computer-implemented method of claim 14, wherein said calculating further comprises:
  obtaining, from a memory device associated with said at least one AP, at least one data element pertaining to Channel Status Information (CSI) associated with said dataframes; and (ii) calculating said feature vector based on the angle parameters and the at least one CSI data element.

16. The computer-implemented method of claim 13, wherein said labels further include, with respect to each of said dataframes and/or feature vectors, indication of one of the following operational parameters: STA operating temperature, AP operating temperature, and signal-to-noise (SNR) ratio value of a signal associated with said dataframe and/or feature vector.

* * * * *